(12) United States Patent
Javid

(10) Patent No.: US 11,826,216 B2
(45) Date of Patent: Nov. 28, 2023

(54) DENTAL COMPOSITE BLADE

(71) Applicant: Hossein Javid, Inglewood, CA (US)

(72) Inventor: Hossein Javid, Inglewood, CA (US)

( * ) Notice: Subject to any disclaimer, the term of this patent is extended or adjusted under 35 U.S.C. 154(b) by 1154 days.

(21) Appl. No.: 16/271,733

(22) Filed: Feb. 8, 2019

(65) Prior Publication Data

US 2019/0239981 A1    Aug. 8, 2019

Related U.S. Application Data

(60) Provisional application No. 62/628,251, filed on Feb. 8, 2018.

(51) Int. Cl.
*A61C 3/02* (2006.01)
*A61C 13/087* (2006.01)
*A61C 3/00* (2006.01)

(52) U.S. Cl.
CPC ............ *A61C 3/02* (2013.01); *A61C 3/00* (2013.01); *A61C 13/087* (2013.01)

(58) Field of Classification Search
CPC ........... A61C 3/02; A61C 3/00; A61C 13/087; A61B 2017/320078; A61B 2017/77
See application file for complete search history.

(56) References Cited

U.S. PATENT DOCUMENTS

| | | |
|---|---|---|
| 1,503,610 A | 8/1924 | Smith |
| 1,691,786 A | 11/1928 | Roth |
| 3,798,688 A | 3/1974 | Wasson |
| 4,060,897 A | 12/1977 | Greenstein |
| 4,173,071 A * | 11/1979 | Ishida ............... A61B 17/3213 30/339 |
| 4,259,069 A | 3/1981 | Lustig |
| 4,270,902 A | 6/1981 | Wiland |
| 4,274,826 A * | 6/1981 | Huey ................. A61C 3/06 30/294 |
| 4,626,212 A | 12/1986 | Mann et al. |
| 5,127,833 A | 7/1992 | Kline |
| 5,388,989 A | 2/1995 | Kountis |
| 5,470,339 A | 11/1995 | Lerrick |
| 5,794,626 A | 8/1998 | Kieturakis |
| 5,934,905 A | 8/1999 | Martoral et al. |
| 6,267,774 B1 | 7/2001 | Ishii et al. |

(Continued)

FOREIGN PATENT DOCUMENTS

WO    2003094757 A1    11/2003

*Primary Examiner* — Yogesh P Patel
(74) *Attorney, Agent, or Firm* — Lance M. Pritikin

(57) ABSTRACT

An exemplary dental composite blade includes a mounting portion and a tool portion. The tool portion may extend between a proximal end and a distal end along an arcuate tool path defined within a transverse plane. The tool portion further includes a proximal section adjacent the proximal end, a distal section adjacent the distal end, an intermediate section between the proximal and distal sections, and first and second lateral edges disposed on opposing sides of the transverse plane. The lateral edges are each preferably convex at the proximal section with respect to the transverse plane, and concave at the intermediate section with respect to the transverse plane. The mounting portion may include an elongated mounting slot for receiving a blade retention element of a blade holder. Particular embodiments of the dental composite blade may include one or more securement flaps for auxiliary engagement of the blade holder.

20 Claims, 23 Drawing Sheets

(56) References Cited

U.S. PATENT DOCUMENTS

| | | | |
|---|---|---|---|
| 6,382,974 B1* | 5/2002 | Garfinkel | A61C 3/00 |
| | | | 433/144 |
| 8,900,258 B2 | 12/2014 | Tjelmeland | |
| 2005/0095558 A1* | 5/2005 | Jones | A61C 3/00 |
| | | | 433/144 |
| 2005/0202373 A1 | 9/2005 | Peng et al. | |
| 2008/0213731 A1 | 9/2008 | Fishburne | |
| 2019/0224862 A1* | 7/2019 | Hou | B26B 11/008 |

* cited by examiner

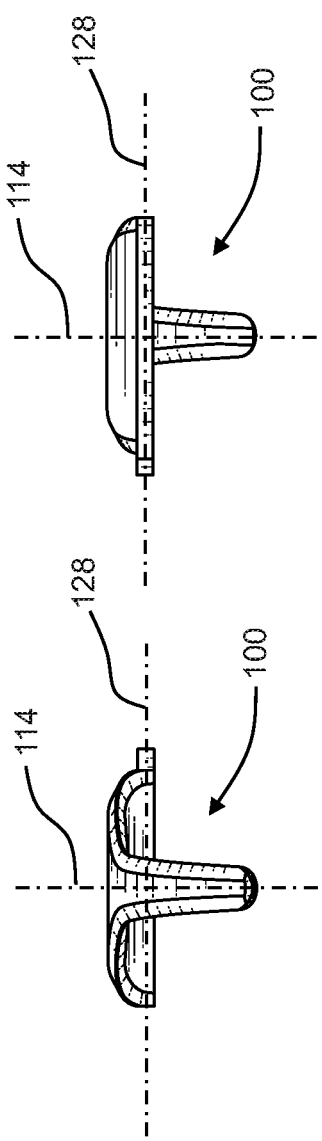
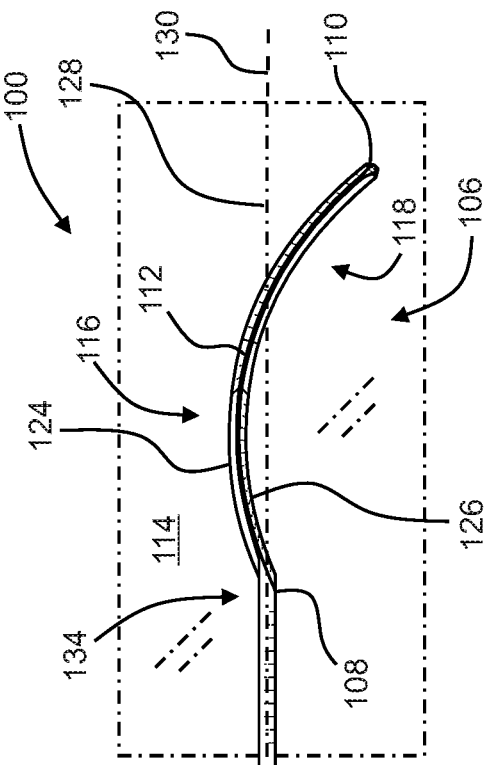
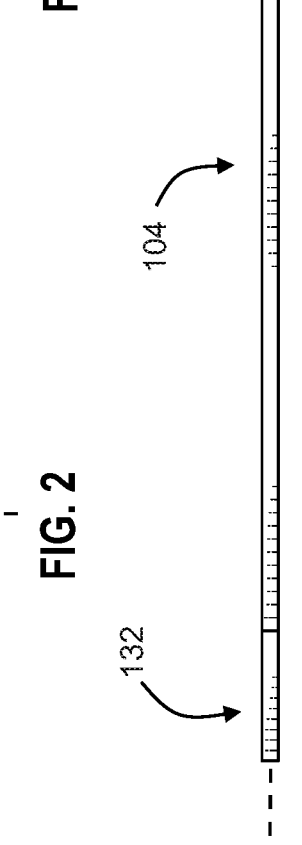
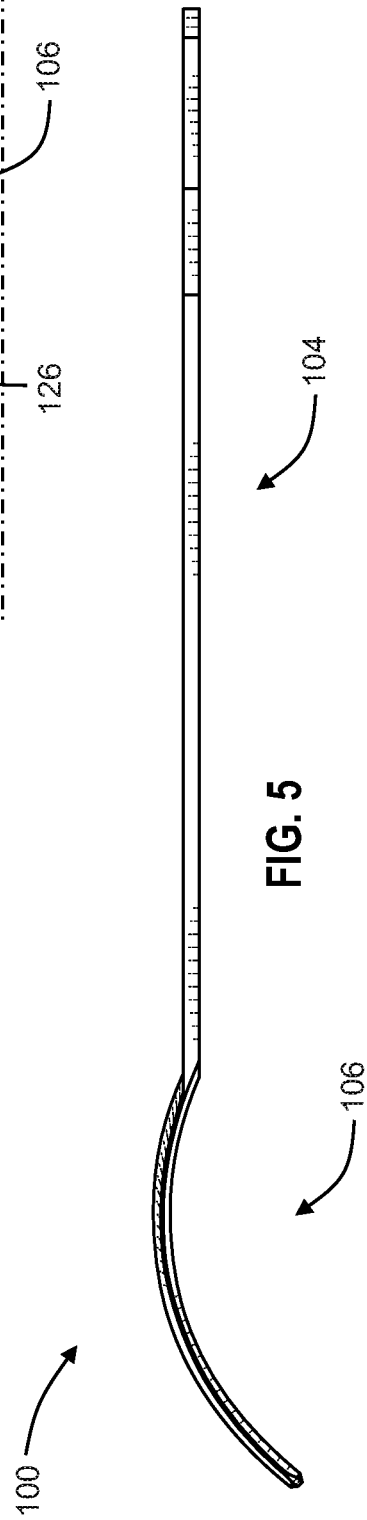
FIG. 2
FIG. 3
FIG. 4
FIG. 5

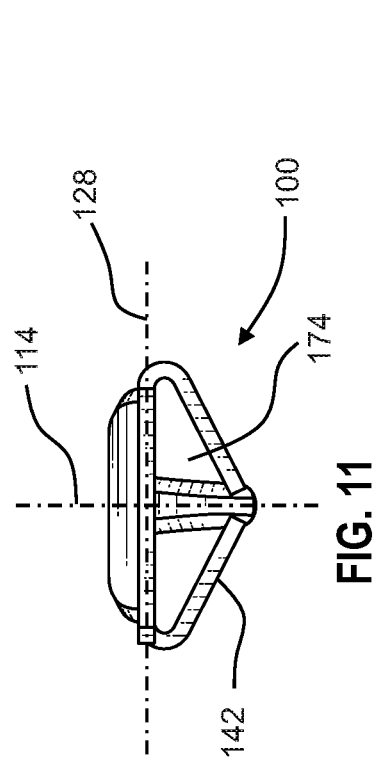
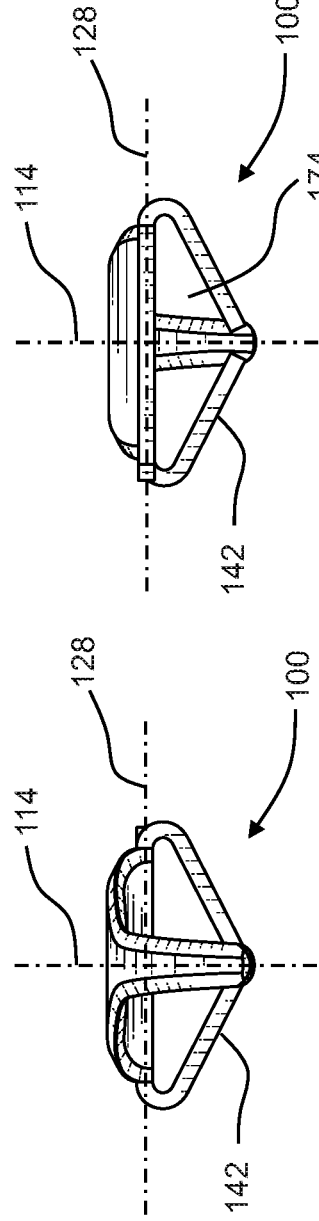
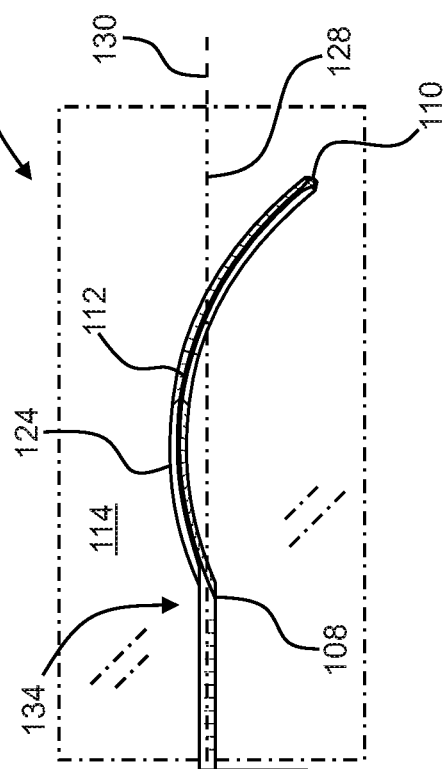
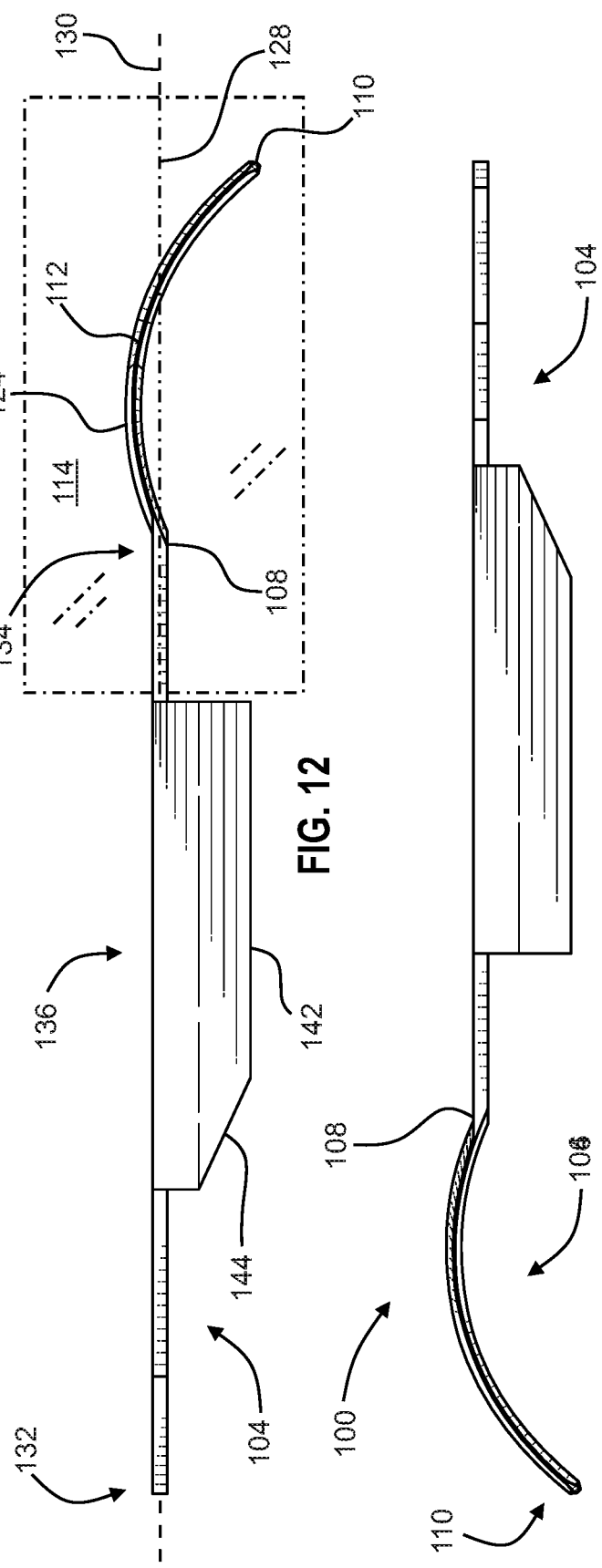

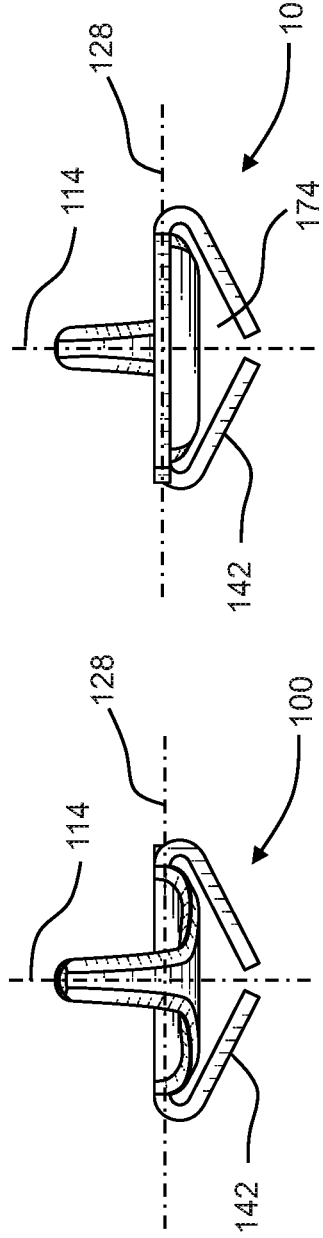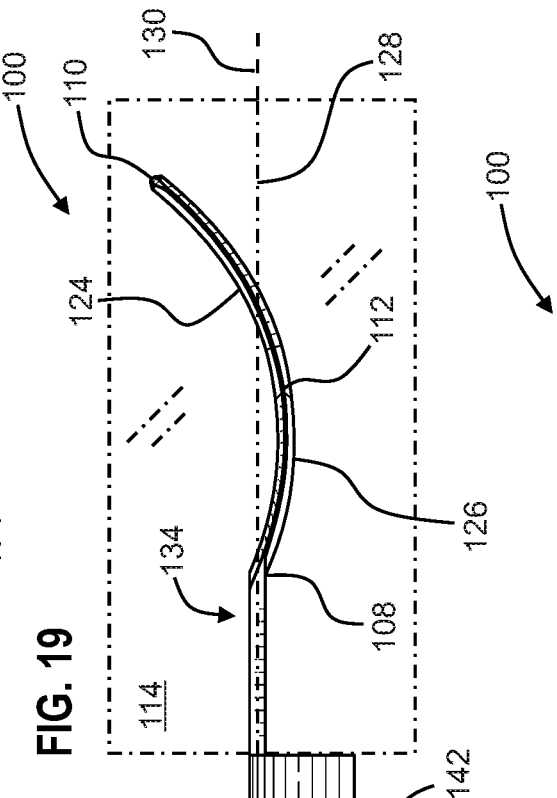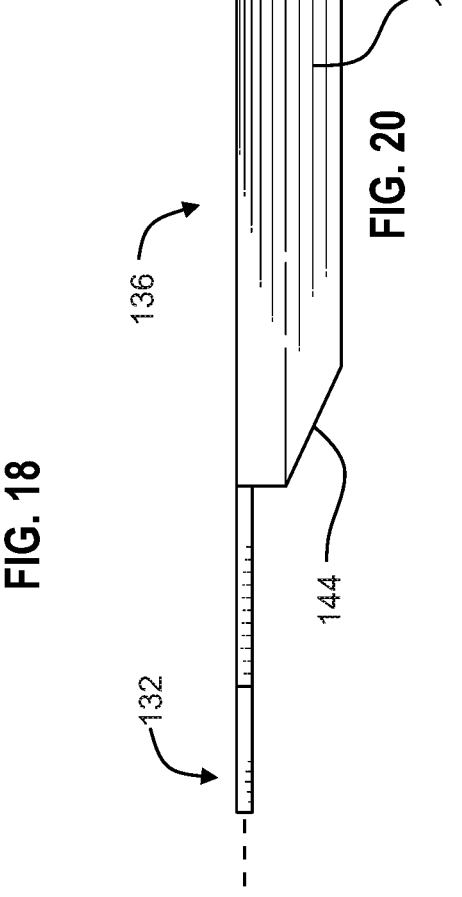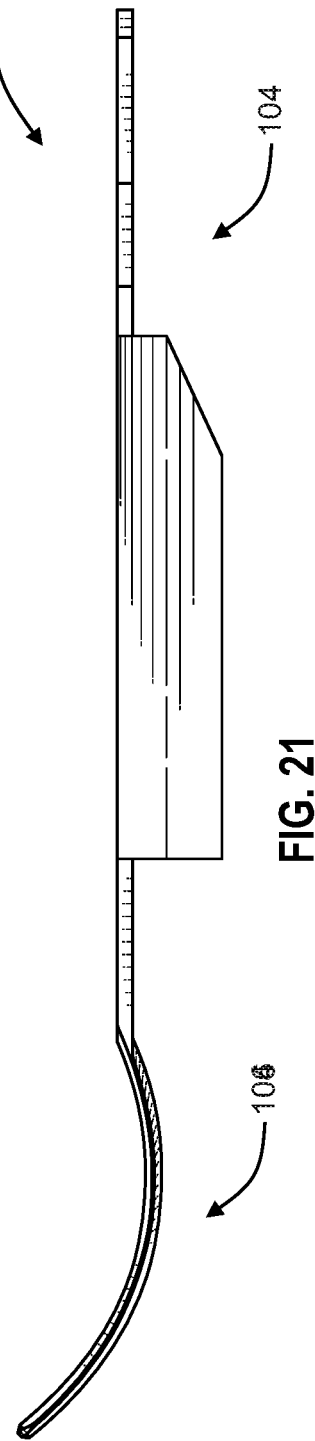

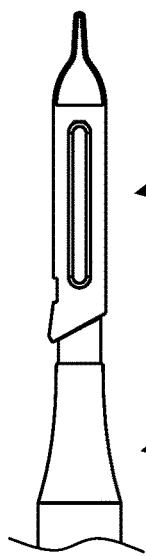 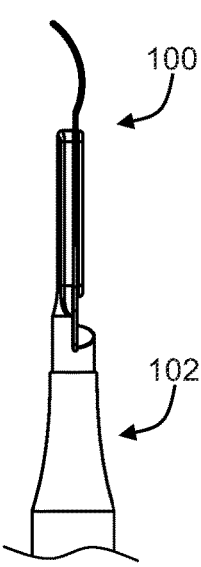 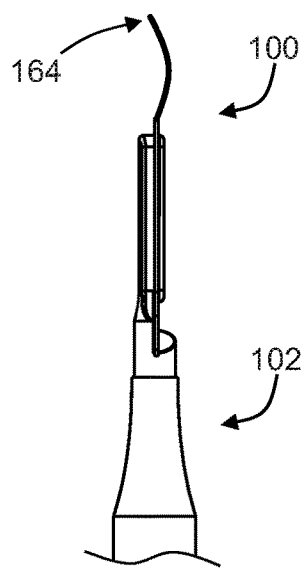
FIG. 41  FIG. 42  FIG. 43
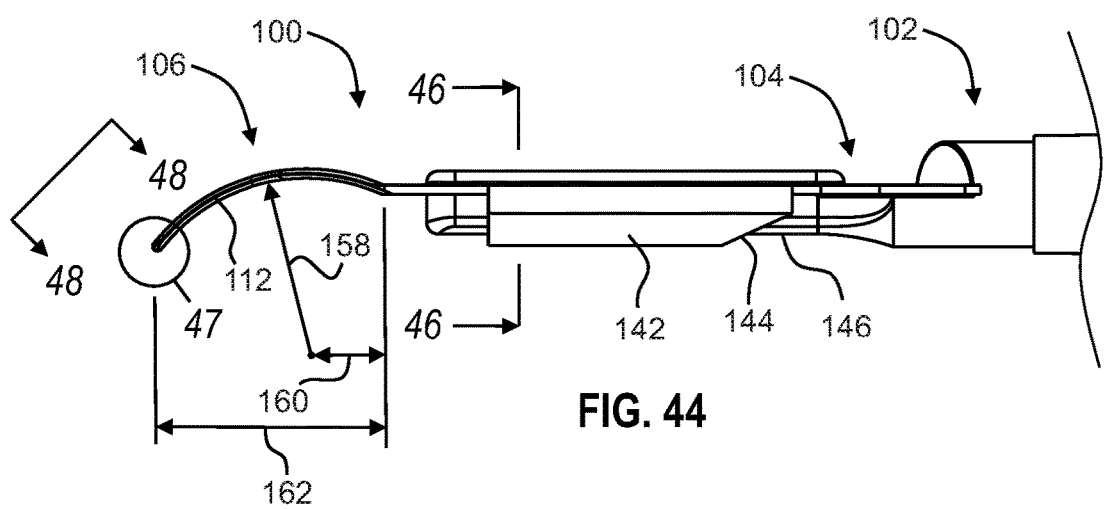
FIG. 44
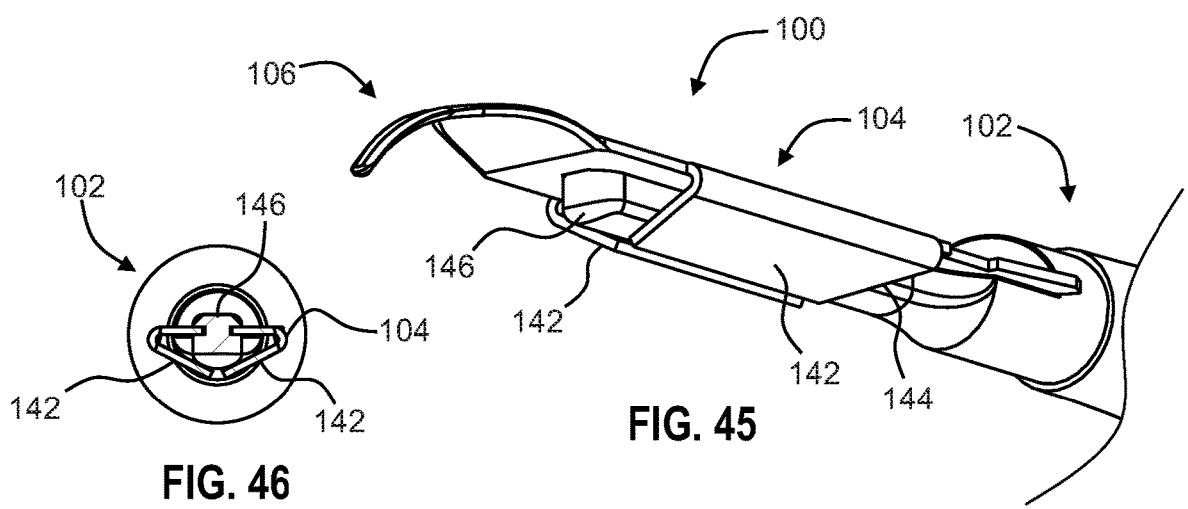
FIG. 46  FIG. 45

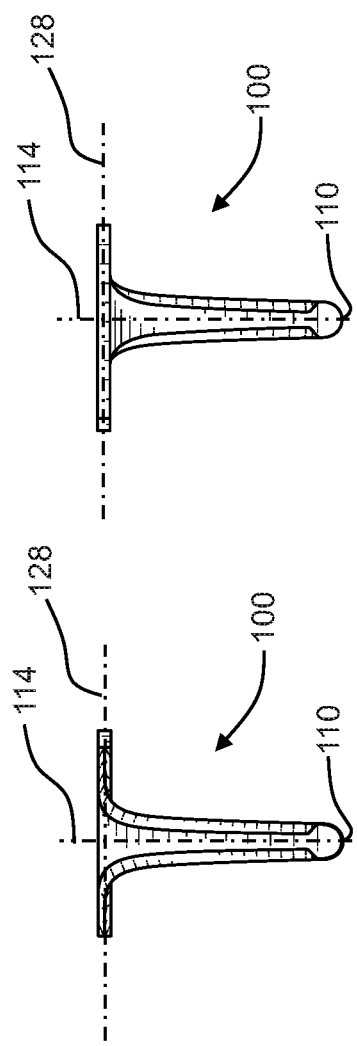
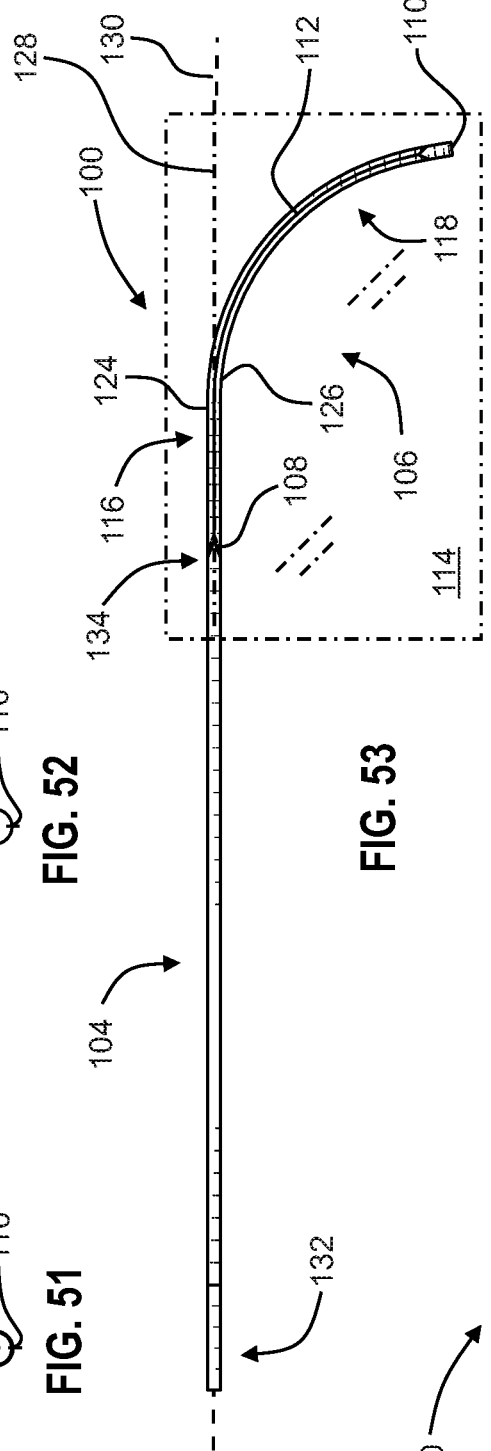
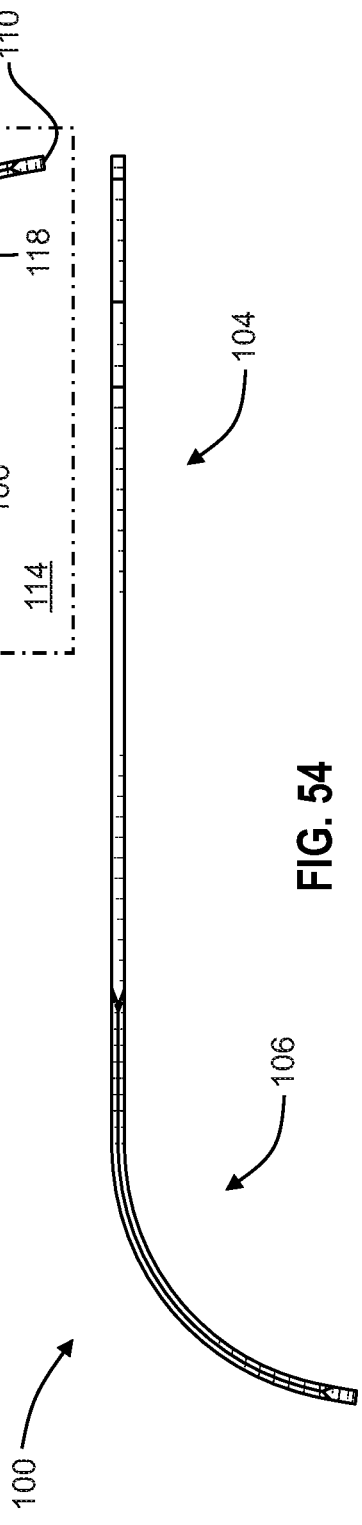
FIG. 51
FIG. 52
FIG. 53
FIG. 54

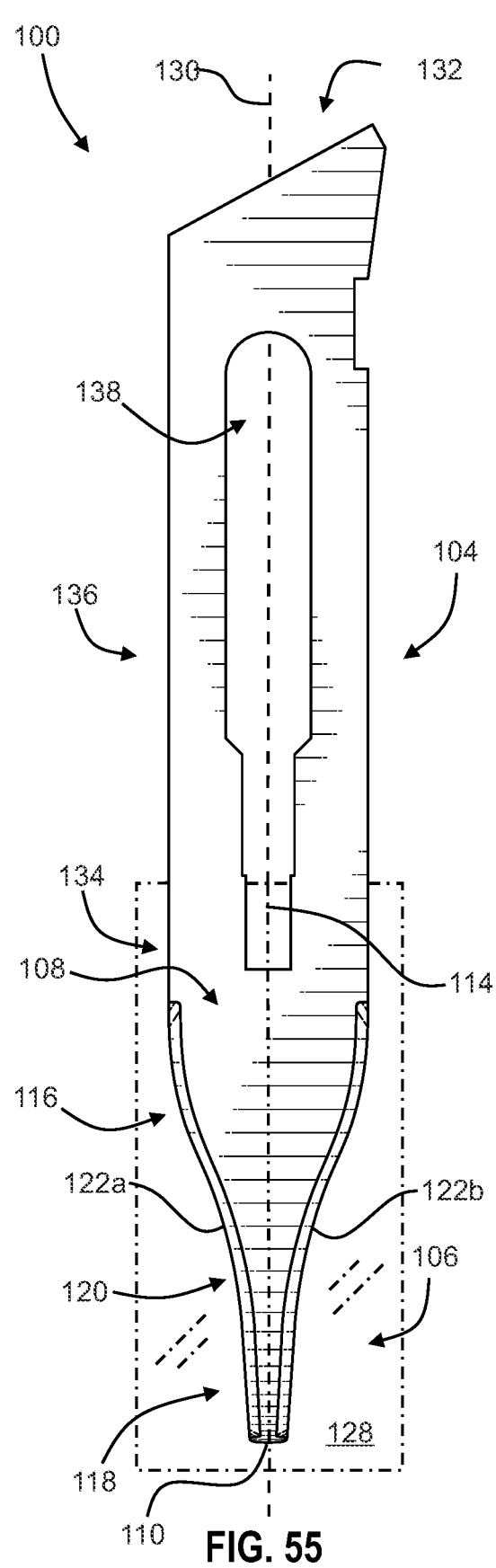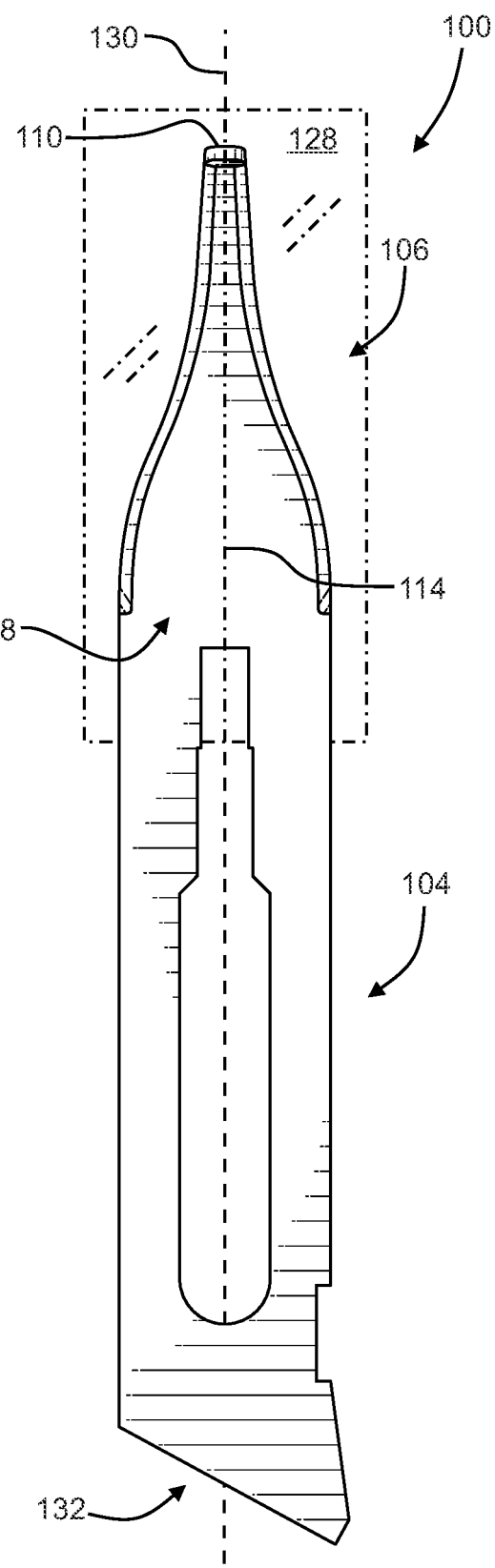
FIG. 55
FIG. 56

DENTAL COMPOSITE BLADE

RELATED APPLICATIONS

This application claims the benefit of U.S. Provisional Application No. 62/628,251 filed Feb. 8, 2018, the content of which is incorporated by this reference its entirety for all purposes as if fully set forth herein.

TECHNICAL FIELD

The present disclosure relates generally to the field of dental hand tools. More particularly, the present disclosure relates to dental composite blades and carvers used in removal of excess resin from surfaces of the tooth during dental restoration procedures.

BACKGROUND

When using composite resin in restorative dentistry, the appearance and longevity of the restoration is key. When entering the finishing or "trimming" stages, if left, overhangs of composite margins, excess material, or any abrupt "step" in the material can cause damage to the appearance, tooth, health of tooth, gum, bone etc. If using a rotary instrument to perform the finishing or trimming stages, the accuracy is often compromised due to factors such as the positioning of the tooth, the speed on the hand piece and the patient's maximum oral opening.

A conventional dental 12-blade is most commonly used worldwide in the finishing of resin restorations. The 12-blade has allowed dentists to shape and remove the excess composite, but not without limits. The 12-blade's single cutting end, non-horizontal, vertical curvature and angle does not adequately allow the dental practitioner to gain access to the mesial and distal surfaces of posterior mandibular and maxillary surfaces.

Also, a conventional rotary bur is frequently used to shape and carve in the finishing of the dental composite. However, the speed of the bur's rotation can impact controllability of the tool. This lack of precise control may result in, for example, trimming into hard tooth surfaces and/or portions of composite not meant to be carved. In addition, the length and curvature of dental burs also limits the removal of excess proximal resin from the reconstruction of the occlusal layering process.

SUMMARY

Certain deficiencies of the prior art may be overcome by the provision of a dental composite blade, embodiments of which are disclosed herein. Such embodiments may feature a double cutting-edge blade having a curvature that follows most natural contours of teeth to help shape and trim the area of excess and/or malformed resin. A non-cutting tip, elliptical tapered curve and double cutting edges may extend down until the shank gives more access to interproximal and occlusal surfaces without having to switch blades, hands, or sides of mouth so as to avoid causing trauma to the surrounding tissue. The dental composite blade may be comprised of a stainless and/or carbon steel that does not stain tooth colored resins.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 2 is a diagrammatic front view of the dental composite blade shown in FIG. 1;

FIG. 3 is a diagrammatic rear view of the dental composite blade shown in FIG. 1;

FIG. 4 is a diagrammatic right-side view of the dental composite blade shown in FIG. 1;

FIG. 5 is a diagrammatic left-side view of the dental composite blade shown in FIG. 1;

FIG. 10 is a diagrammatic front view of the dental composite blade shown in FIG. 9;

FIG. 11 is a diagrammatic rear view of the dental composite blade shown in FIG. 9;

FIG. 12 is a diagrammatic right-side view of the dental composite blade shown in FIG. 9;

FIG. 13 is a diagrammatic left-side view of the dental composite blade shown in FIG. 9;

FIG. 18 is a diagrammatic front view of the dental composite blade shown in FIG. 17;

FIG. 19 is a diagrammatic rear view of the dental composite blade shown in FIG. 17;

FIG. 20 is a diagrammatic right-side view of the dental composite blade shown in FIG. 17;

FIG. 21 is a diagrammatic left-side view of the dental composite blade shown in FIG. 17;

FIG. 41 is a diagrammatic partial plan view of an example dental composite blade assembly similar to that of FIG. 37;

FIG. 42 is a diagrammatic partial side view of the example dental composite blade assembly shown in FIG. 41, wherein the tool portion of the blade is shown unflexed;

FIG. 43 is a diagrammatic partial side view similar to that of FIG. 42, but wherein the tool portion of the blade is shown partially recently flexed as a result of pressure being applied to the reverse face of the tool portion during a dental procedure;

FIG. 44 is a diagrammatic partial side view of an example dental composite blade assembly, wherein the blade includes securement flaps which engage the underside of the blade retention element of the blade holder to provide increased stability of the blade on the holder;

FIG. 45 is a diagrammatic partial perspective view of the example dental composite blade assembly shown in FIG. 44;

FIG. 46 is a diagrammatic cross-sectional view taken along line 46-46 of FIG. 44, illustrating the potential engagement of example securement flaps with the blade retention element;

FIG. 51 is a diagrammatic front view of the dental composite blade shown in FIG. 49;

FIG. 52 is a diagrammatic rear view of the dental composite blade shown in FIG. 49;

FIG. 53 is a diagrammatic right-side view of the dental composite blade shown in FIG. 49;

FIG. 54 is a diagrammatic left-side view of the dental composite blade shown in FIG. 49;

FIG. 55 is a diagrammatic top view of the dental composite blade shown in FIG. 49;

FIG. 56 is a diagrammatic bottom view of the dental composite blade shown in FIG. 49;

DETAILED DESCRIPTION OF THE PREFERRED EMBODIMENTS

Figure 1:
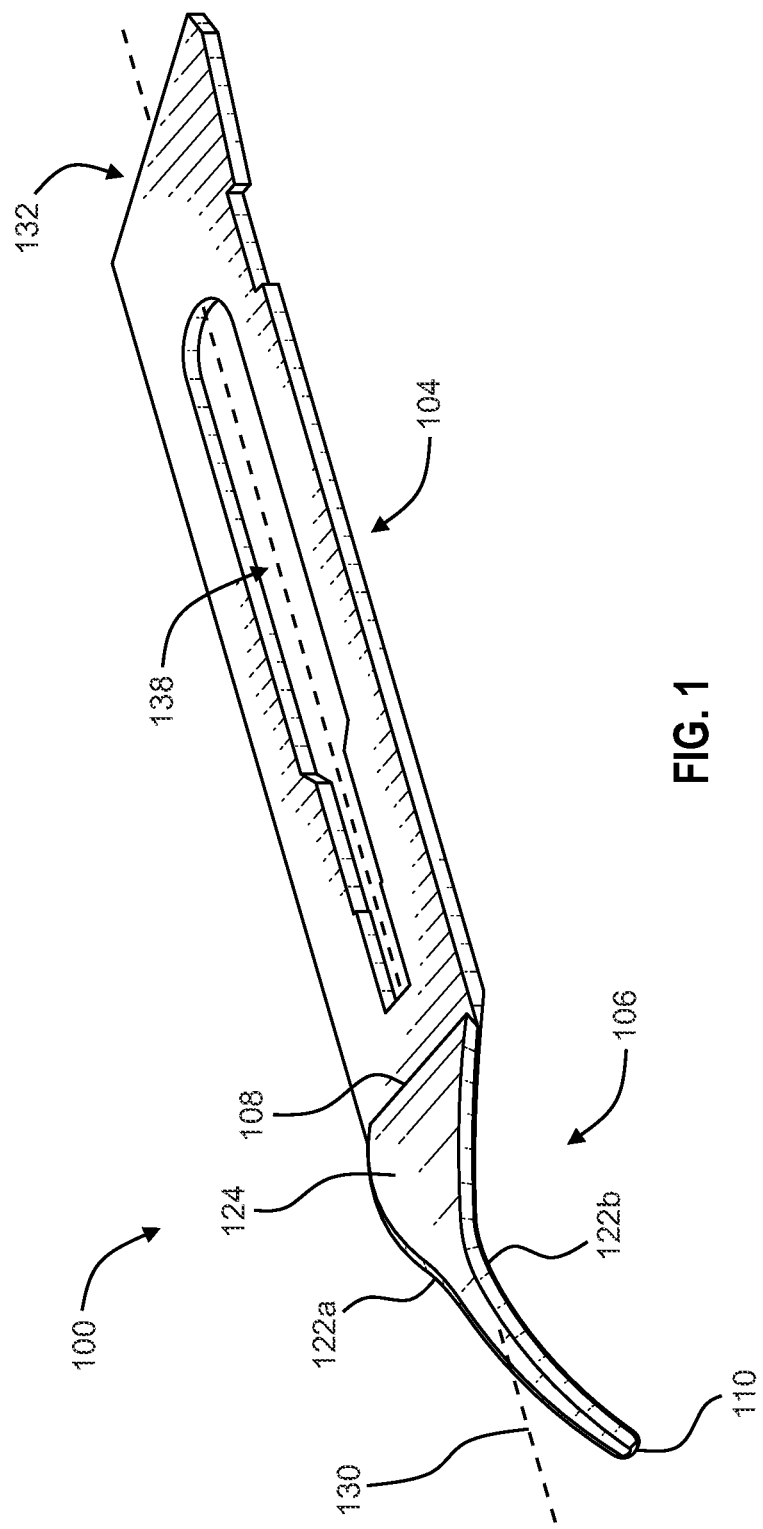
FIG. 1 is a perspective view of an example dental composite blade in accordance with the present disclosure.

Referring now to the drawings, like reference numerals designate identical or corresponding features throughout the several views.

Figure 6:
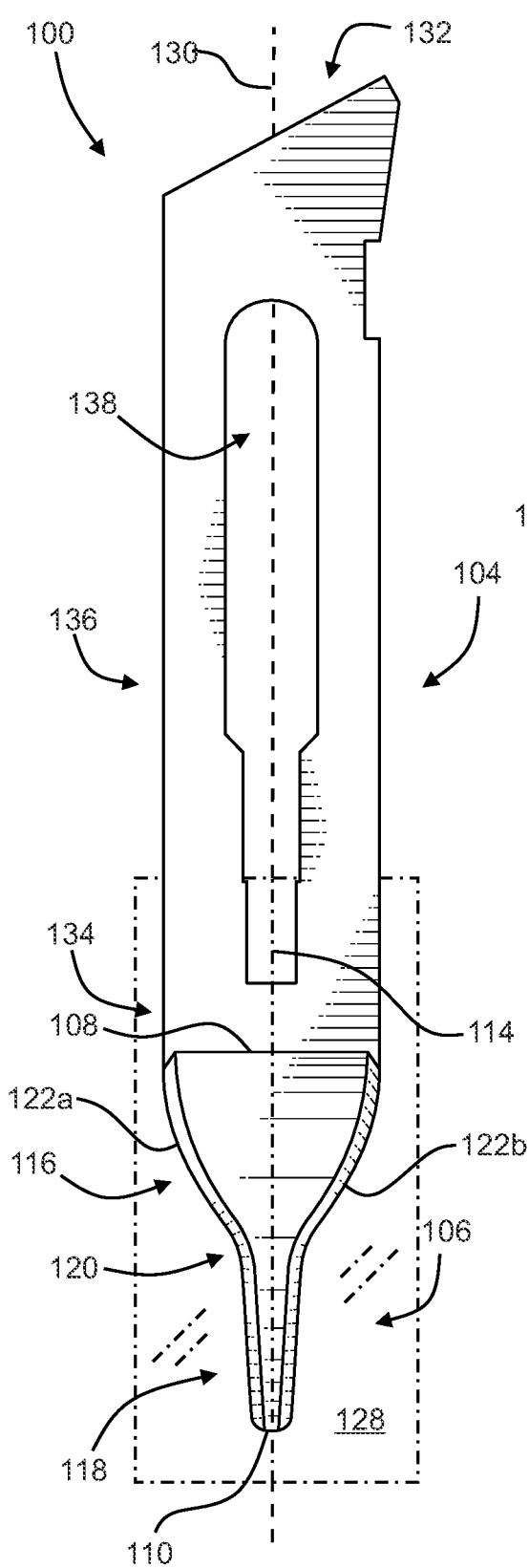
FIG. 6 is a diagrammatic top view of the dental composite blade shown in FIG. 1.
Figure 7:
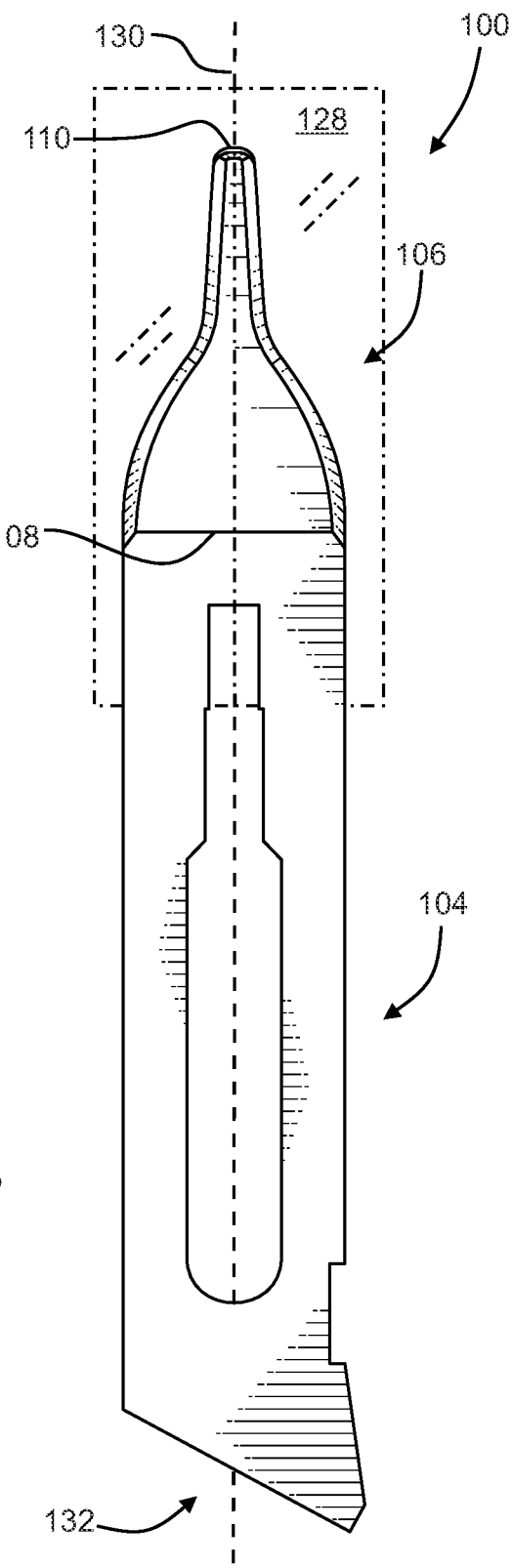
FIG. 7 is a diagrammatic bottom view of the dental composite blade shown in FIG. 1.
Figure 8:
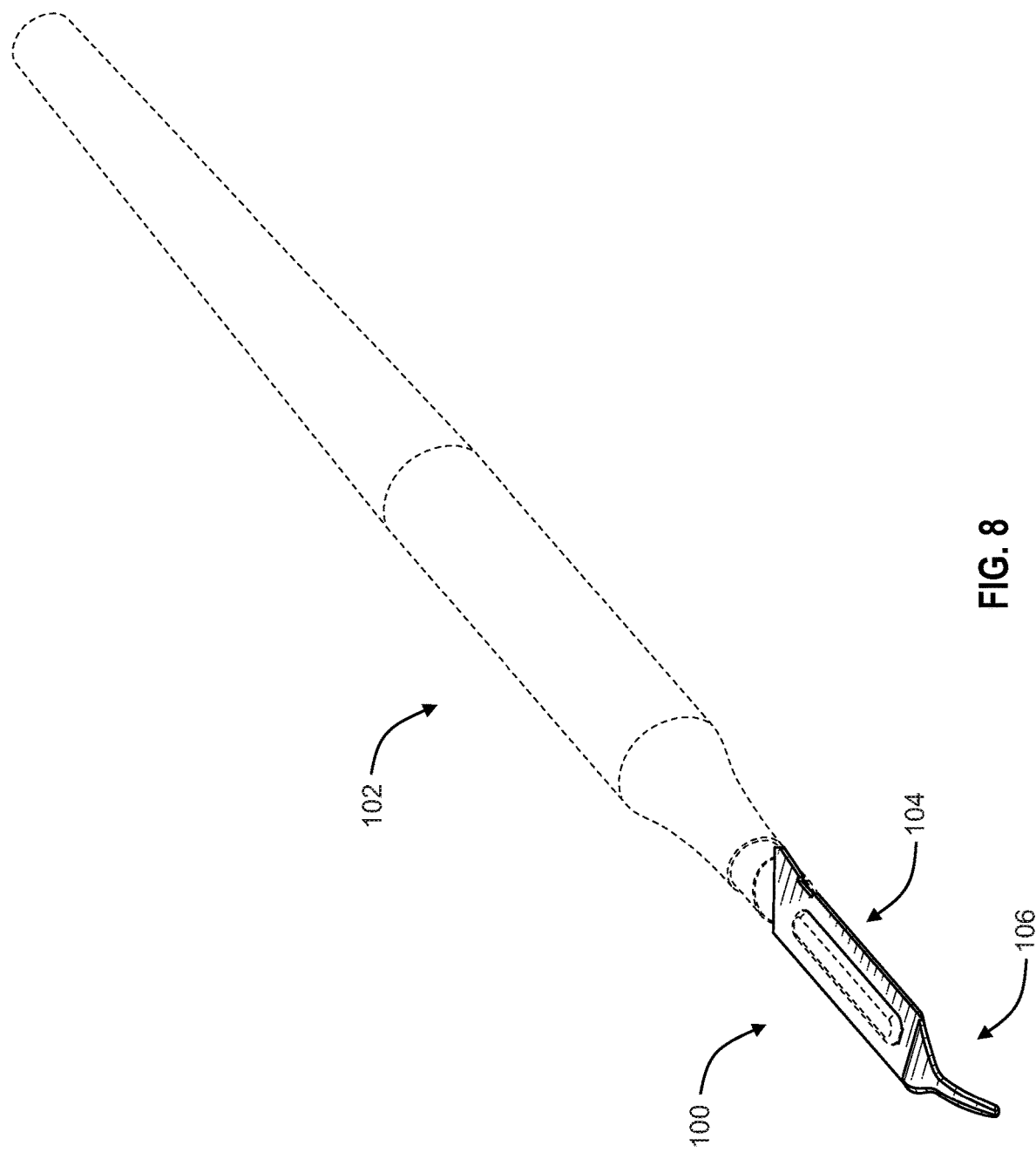
FIG. 8 is a diagrammatic perspective view of the dental composite blade shown in FIG. 1 shown mounted to an example blade holder, the blade holder being shown in broken lines.
Figure 9:
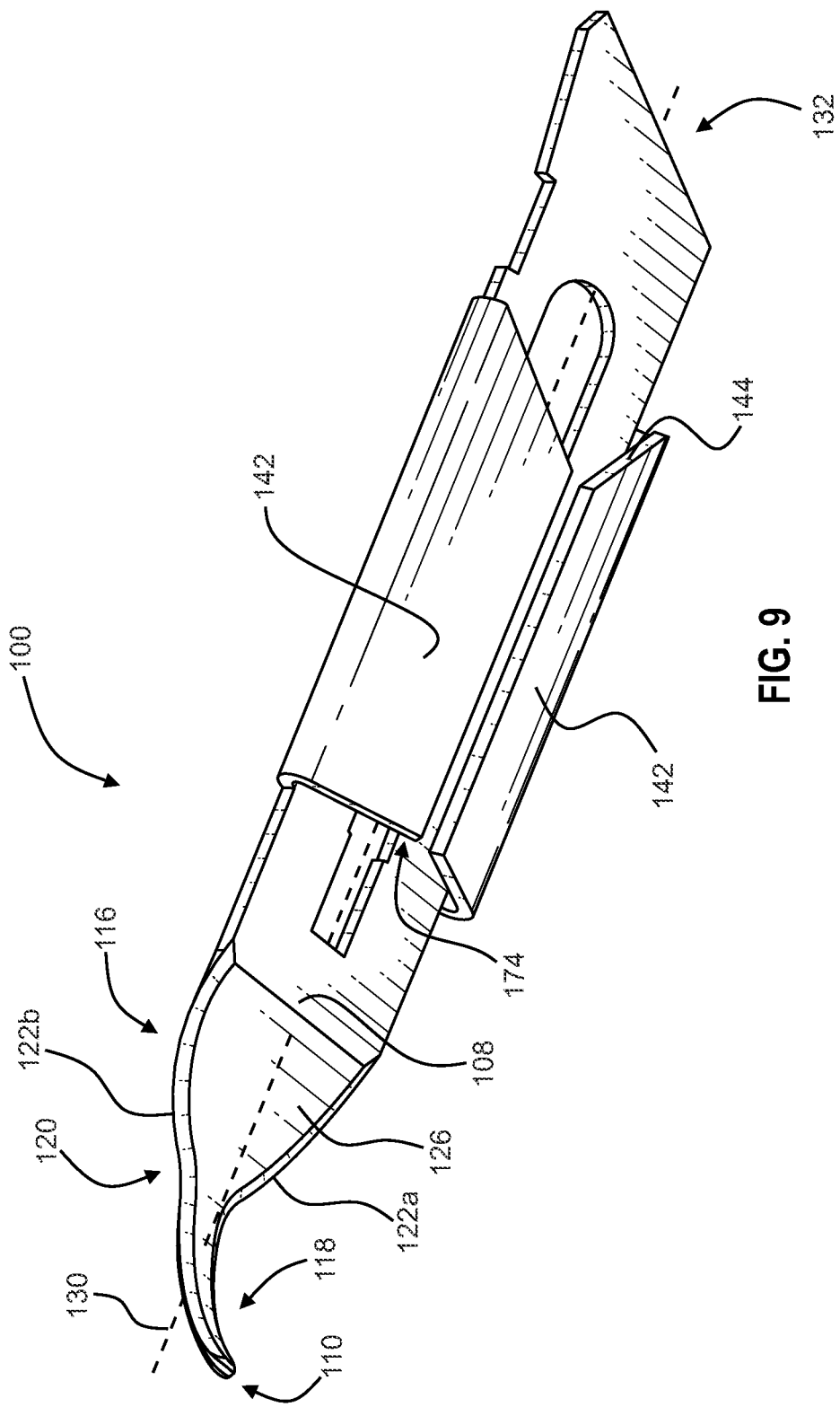
FIG. 9 is a perspective view of an alternate example of a dental composite blade in accordance with the present disclosure, wherein the securement section of the mounting portion includes securement flaps.
Figure 14:
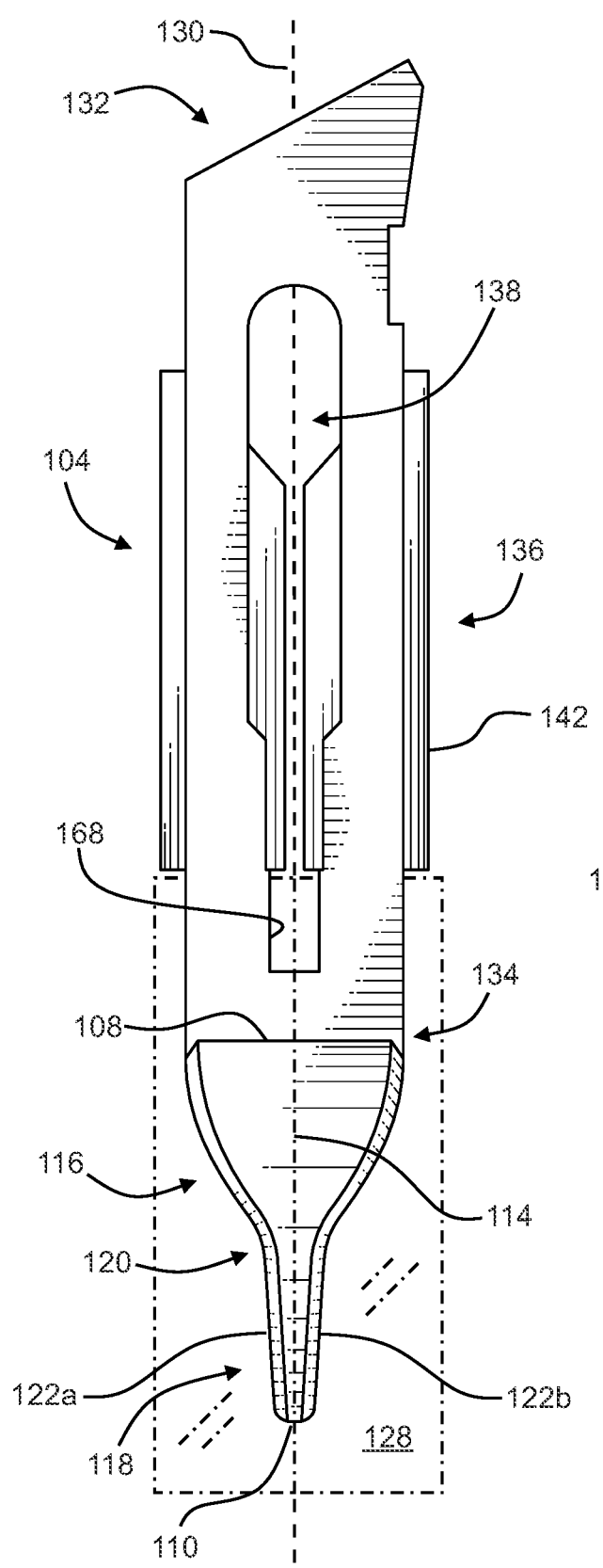
FIG. 14 is a diagrammatic top view of the dental composite blade shown in FIG. 9.
Figure 15:
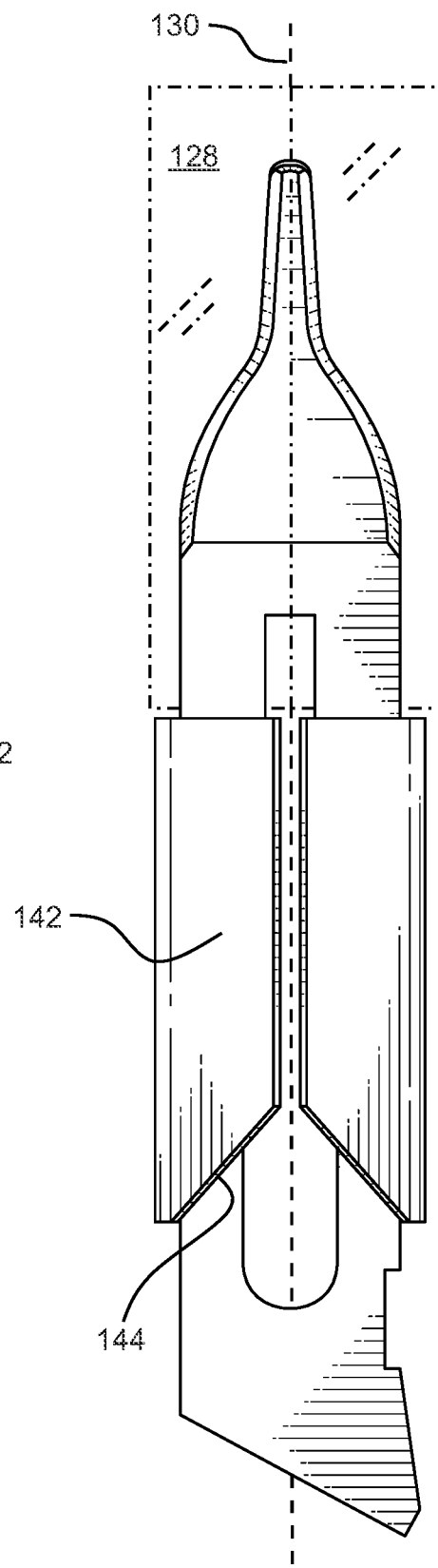
FIG. 15 is a diagrammatic bottom view of the dental composite blade shown in FIG. 9.
Figure 16:
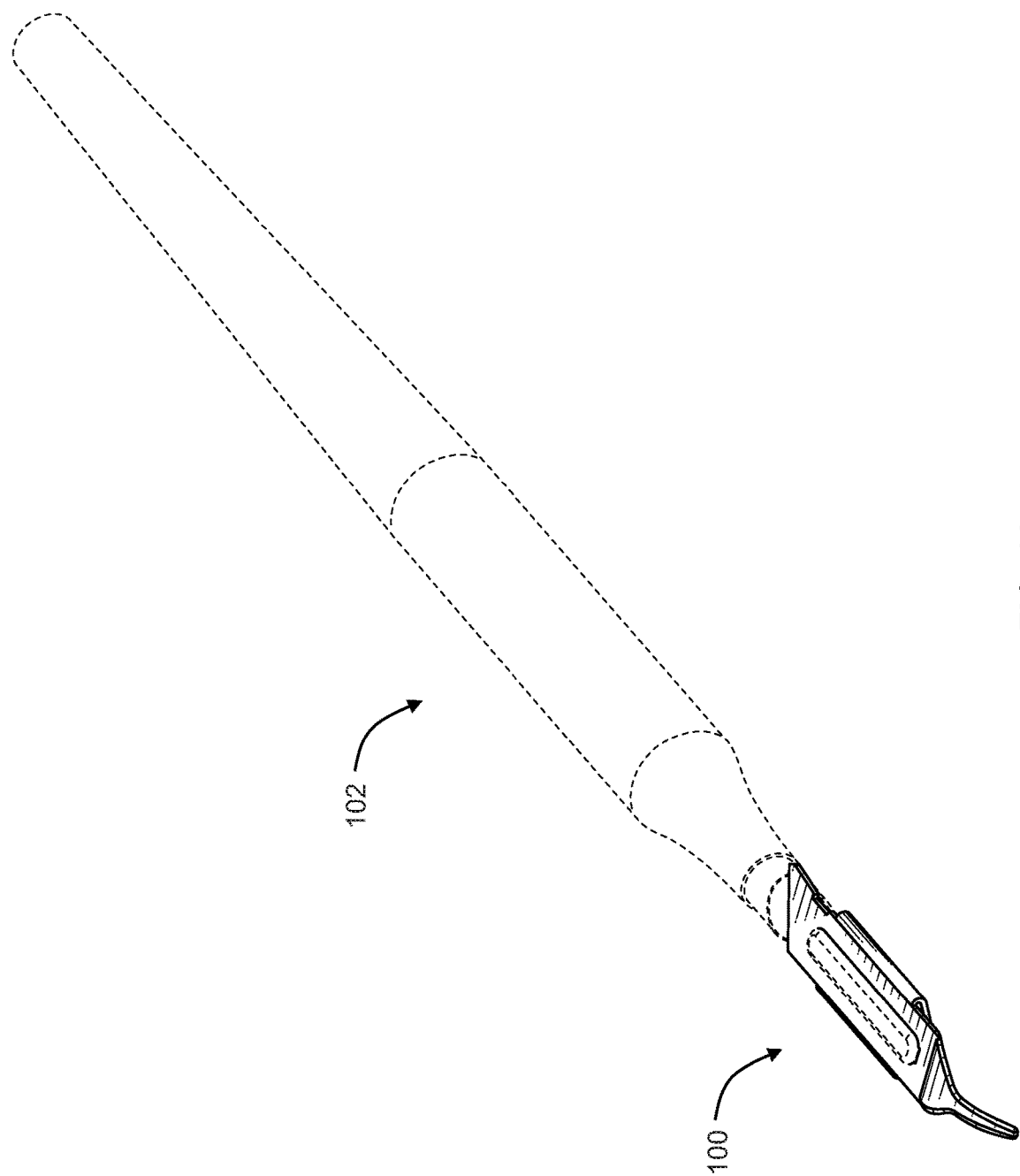
FIG. 16 is a diagrammatic perspective view of the dental composite blade shown in FIG. 9 mounted to an example blade holder, the blade holder being shown in broken lines.
Figure 17:
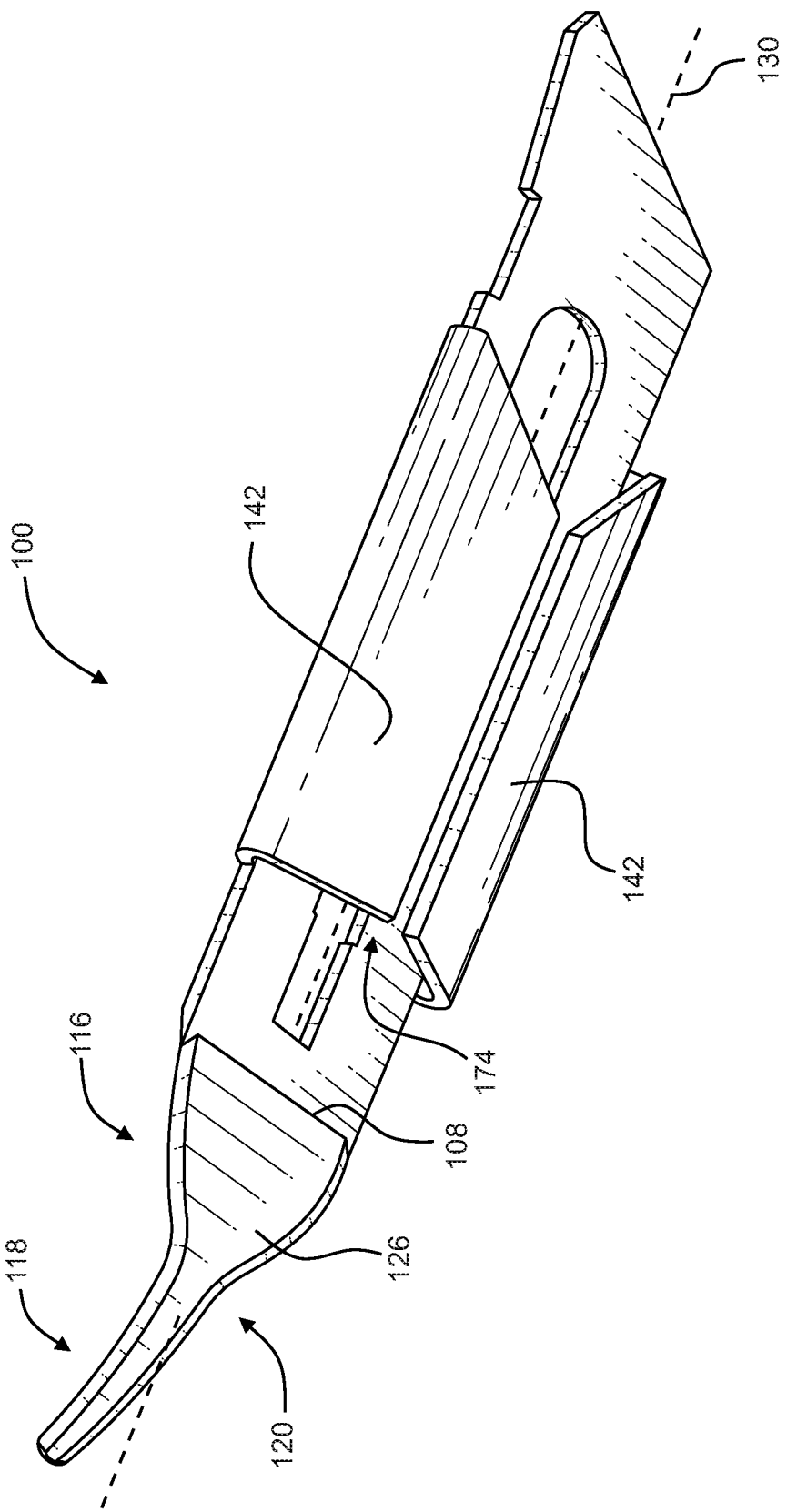
FIG. 17 is a perspective view of a second alternate example of a dental composite blade in accordance with the present disclosure, wherein the securement section of the mounting portion includes securement flaps on the side of the blade opposite of the direction the distal end is pointing.
Figures 22, 23:
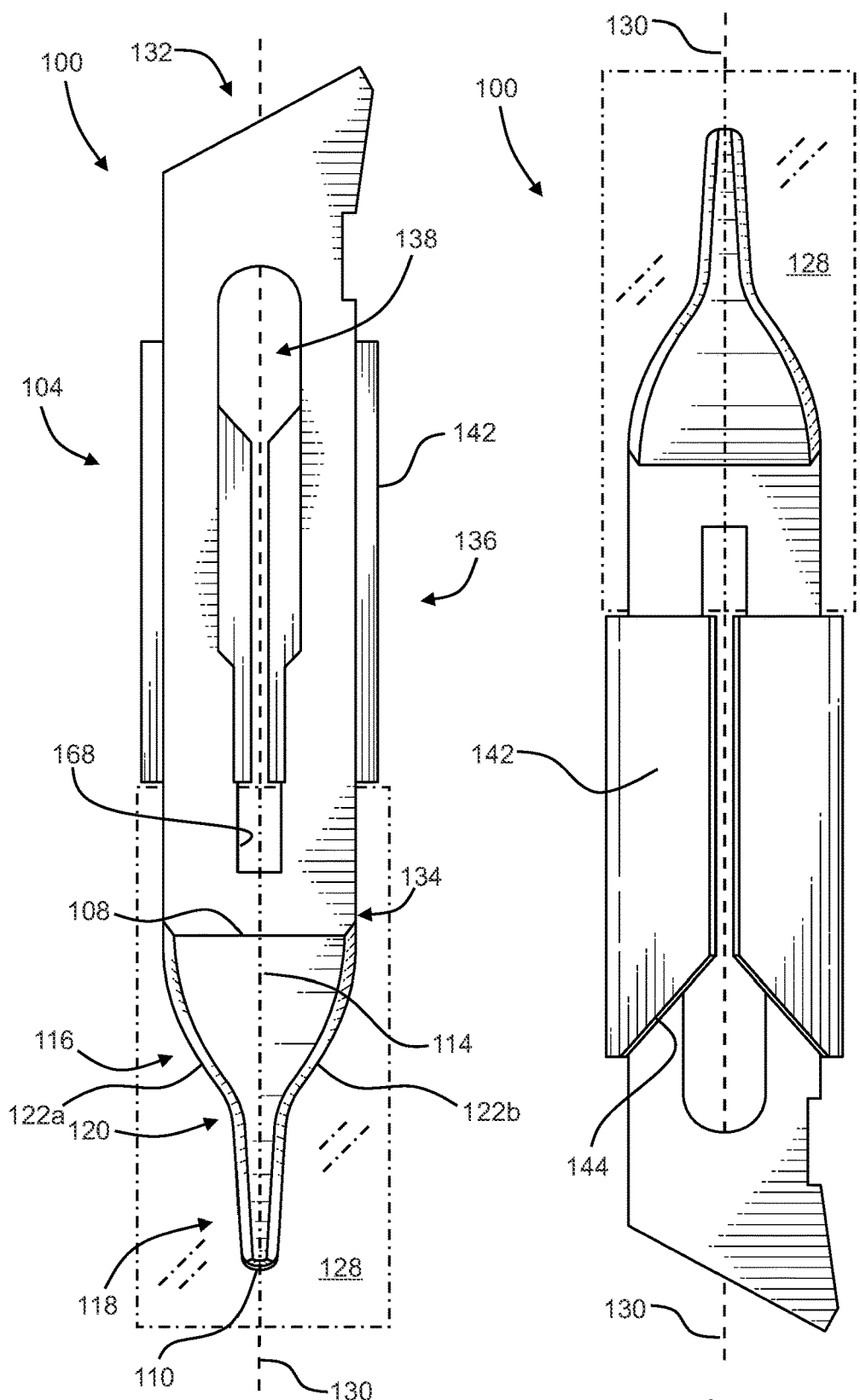
FIG. 22 is a diagrammatic top view of the dental composite blade shown in FIG. 17.
FIG. 23 is a diagrammatic bottom view of the dental composite blade shown in FIG. 17.
Figure 24:
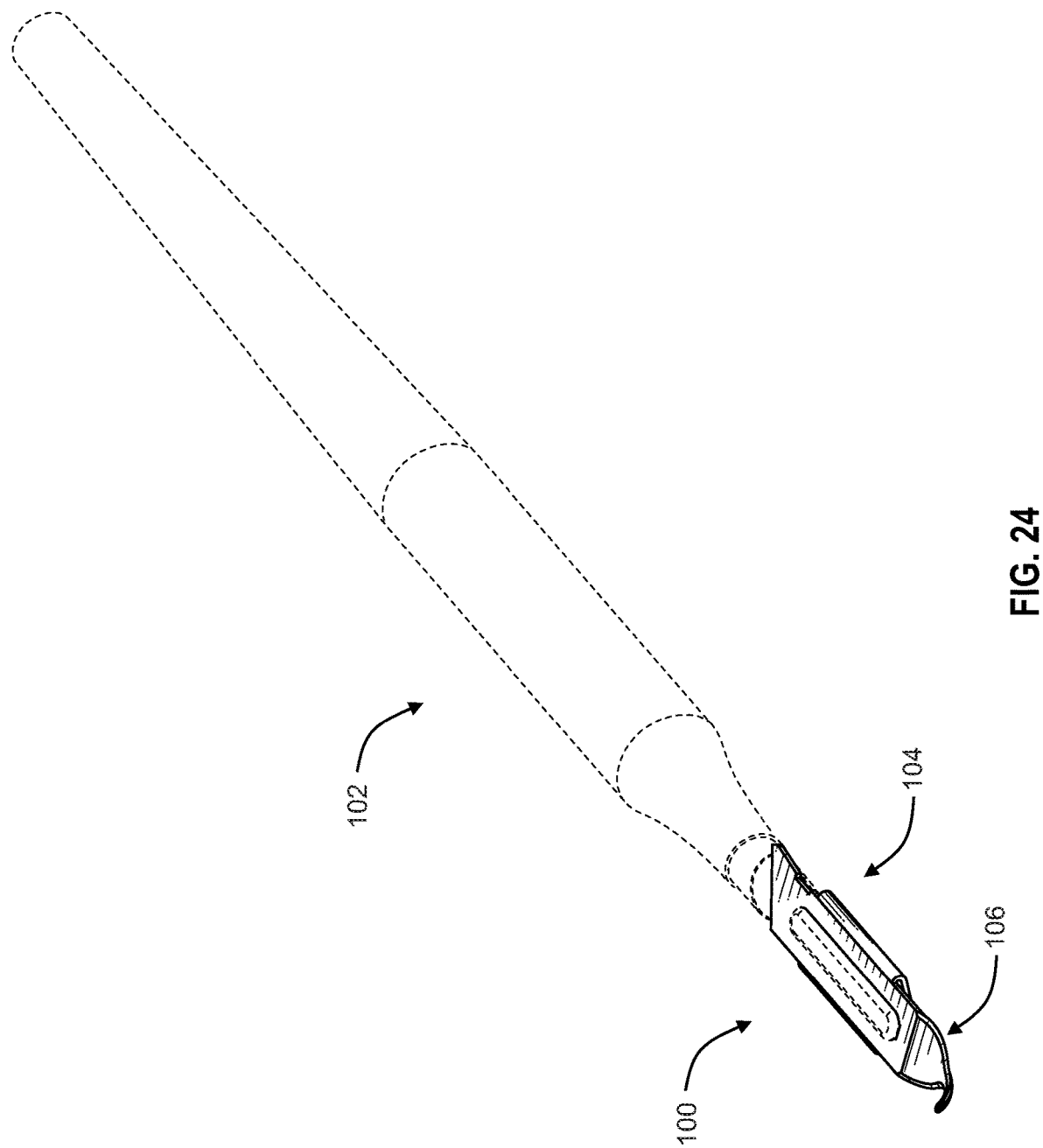
FIG. 24 is a diagrammatic perspective view of the dental composite blade shown in FIG. 17 mounted to an example blade holder, the blade holder being shown in broken lines.
Figure 25:
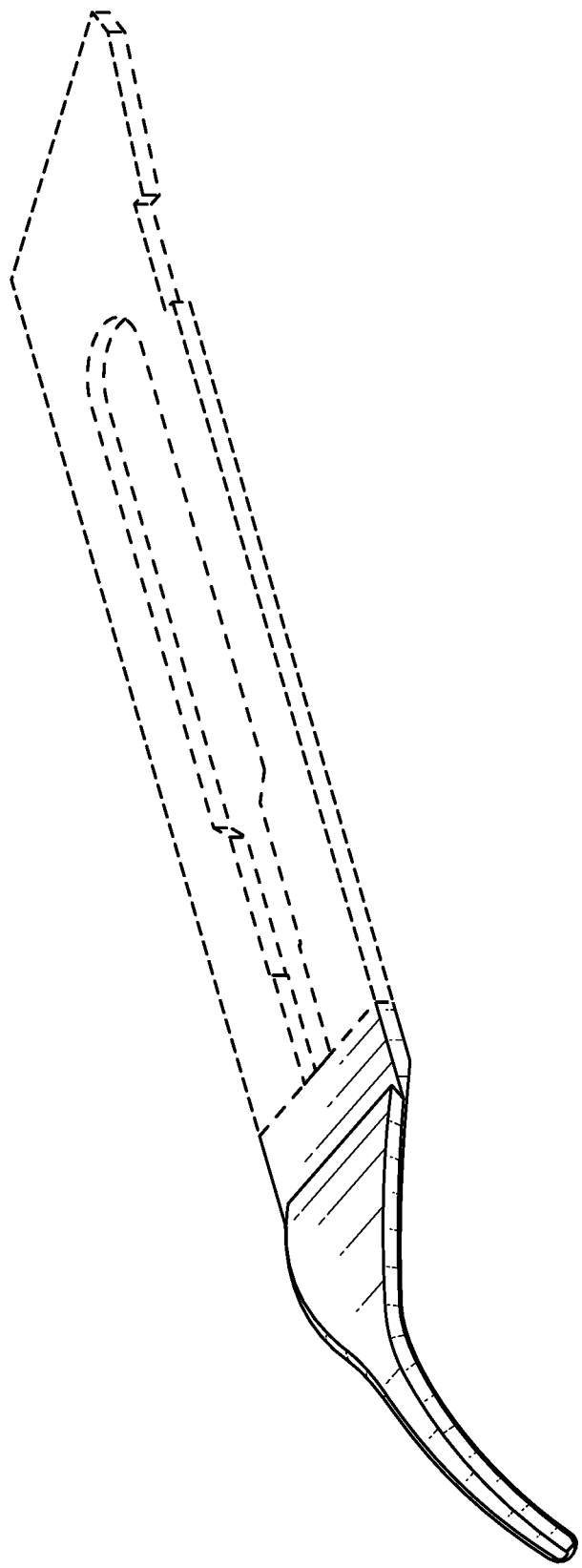
FIG. 25 is a perspective view of a third alternate example of a dental composite blade in accordance with the present disclosure, the broken lines depicting certain variable or non-essential aspects of this example.
Figure 26:
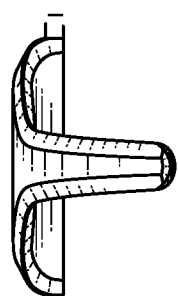
FIG. 26 is a diagrammatic front view of the dental composite blade shown in FIG. 25.
Figure 27:
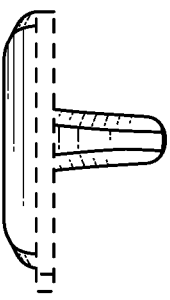
FIG. 27 is a diagrammatic rear view of the dental composite blade shown in FIG. 25.
Figure 28:
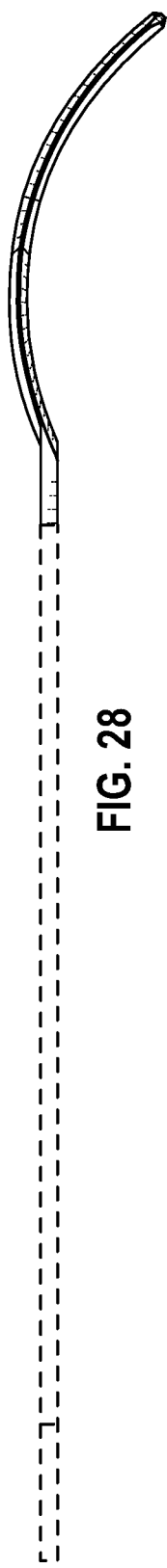
FIG. 28 is a diagrammatic right-side view of the dental composite blade shown in FIG. 25.
Figure 29:
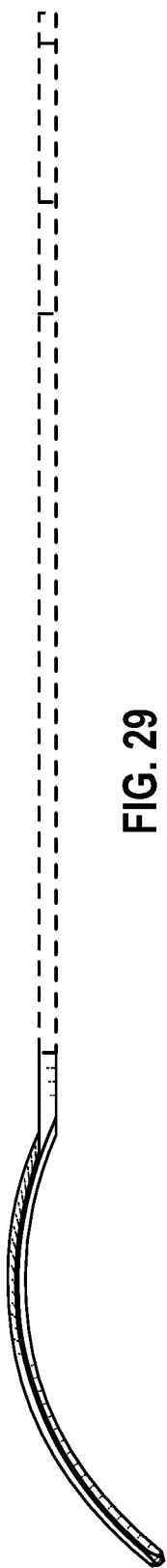
FIG. 29 is a diagrammatic left-side view of the dental composite blade shown in FIG. 25.
Figure 30:
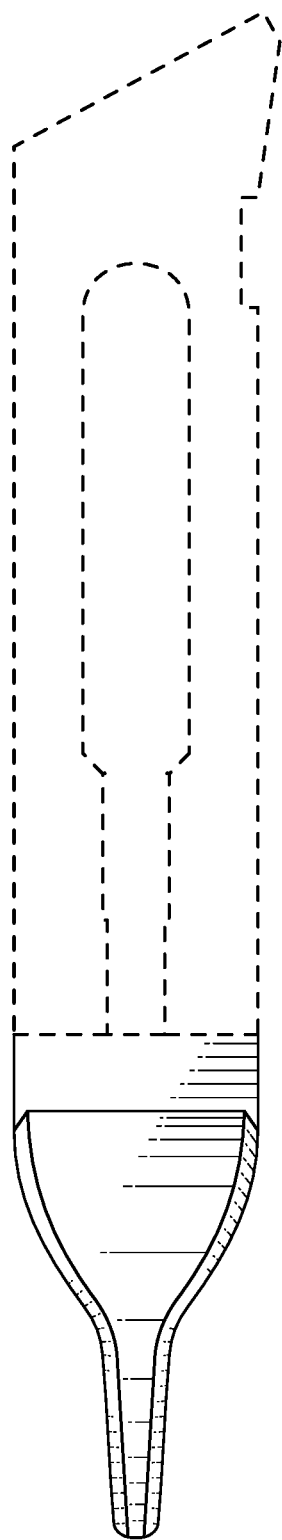
FIG. 30 is a diagrammatic top view of the dental composite blade shown in FIG. 25.
Figure 31:
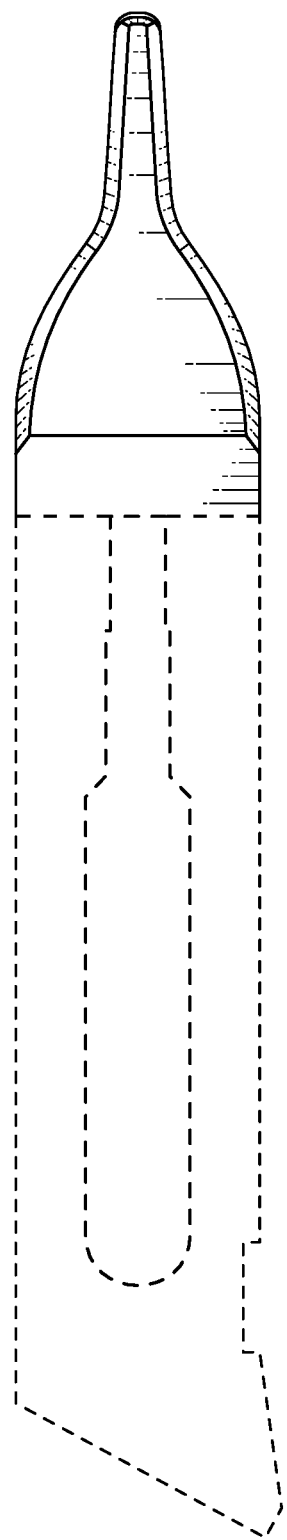
FIG. 31 is a diagrammatic bottom view of the dental composite blade shown in FIG. 25.
Figure 50:
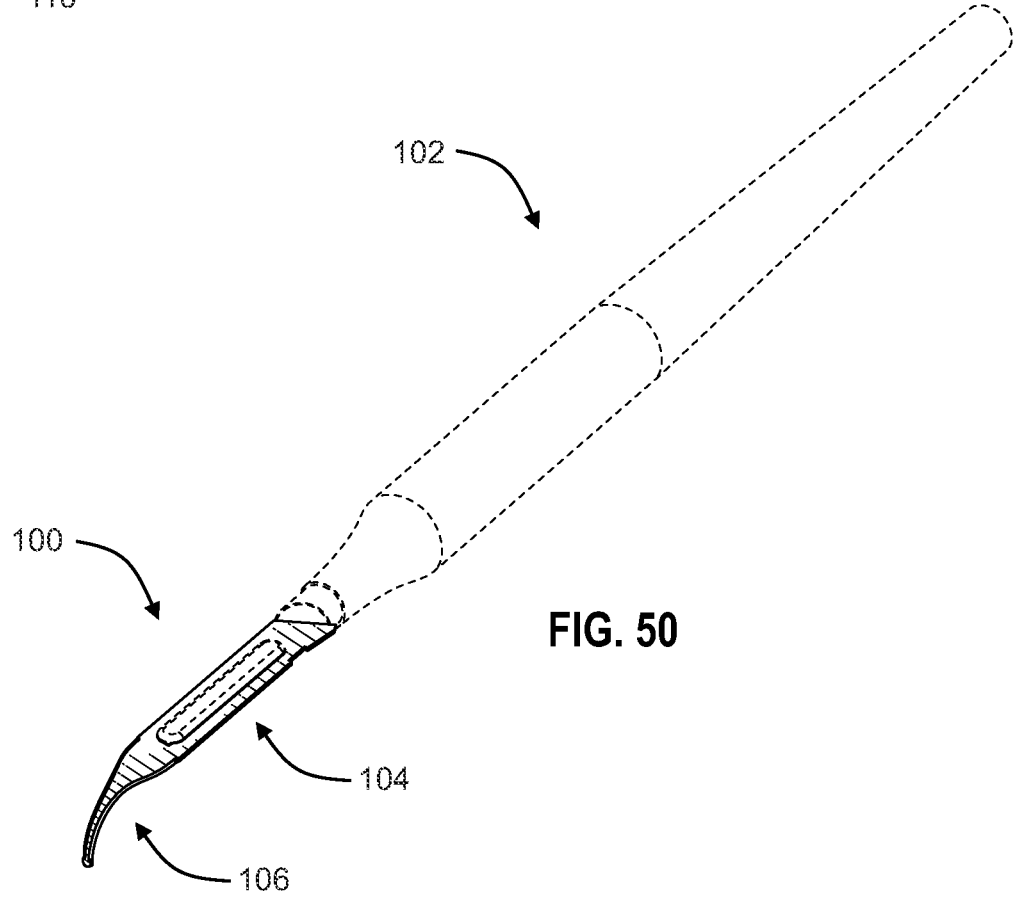
FIG. 50 is a diagrammatic perspective view of the dental composite blade shown in FIG. 49 mounted to an example blade holder, the blade holder being shown in broken lines.

Various example embodiments of a dental composite blade 100 in accordance with the present disclosure are illustrated in the several drawings presented herewith, and may comprise a mounting portion 104 and a tool portion 106. Referring to FIGS. 8 and 50, the mounting portion 104 may be configured for mounting the blade 100 to a blade holder 102. Referring to FIGS. 4 and 53, the tool portion 106 may include a proximal end 108 and a distal end 110, and may extend therebetween along a tool path 112 defined within a transverse plane 114. As illustrated in FIGS. 4 and 20, the tool path 112 may preferably be an arc 112. However, it is envisioned that in particular alternative embodiments of a composite dental blade 100, the tool path 100 may be linear or follow some other shape. Referring to FIGS. 6 and 55, the tool portion 106 may further include a proximal section 116 adjacent the proximal end 108, a distal section 118 adjacent the distal end 110, and an intermediate section 120 between the proximal and distal sections. The blade 100 may be removably mounted to the blade holder 102. The dental composite blade 100 may be comprised of stainless steel, carbon steel, or the like.

Figure 47:
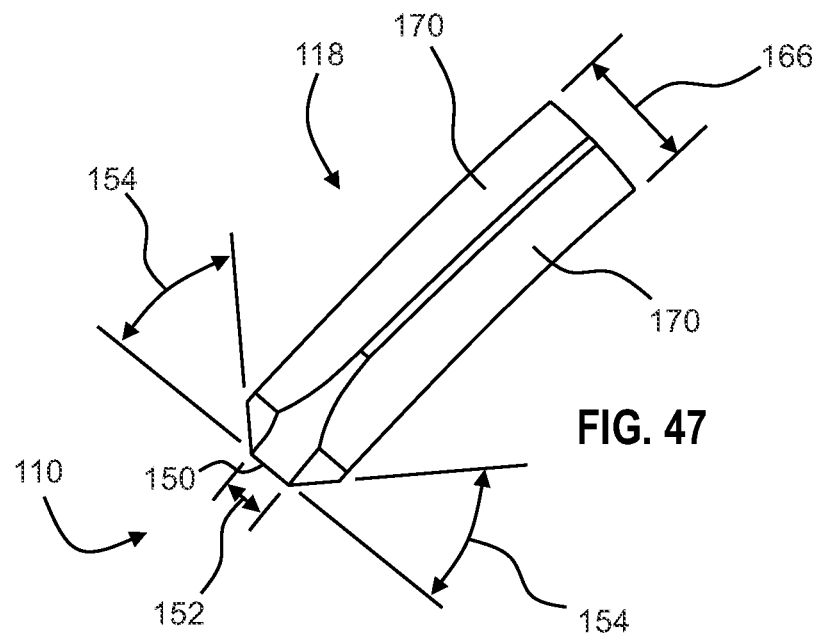
FIG. 47 is a diagrammatic magnified view of detail 47 in FIG. 44, illustrating aspects of the distal end of an example of a dental composite blade in accordance with the present disclosure.
Figure 57:
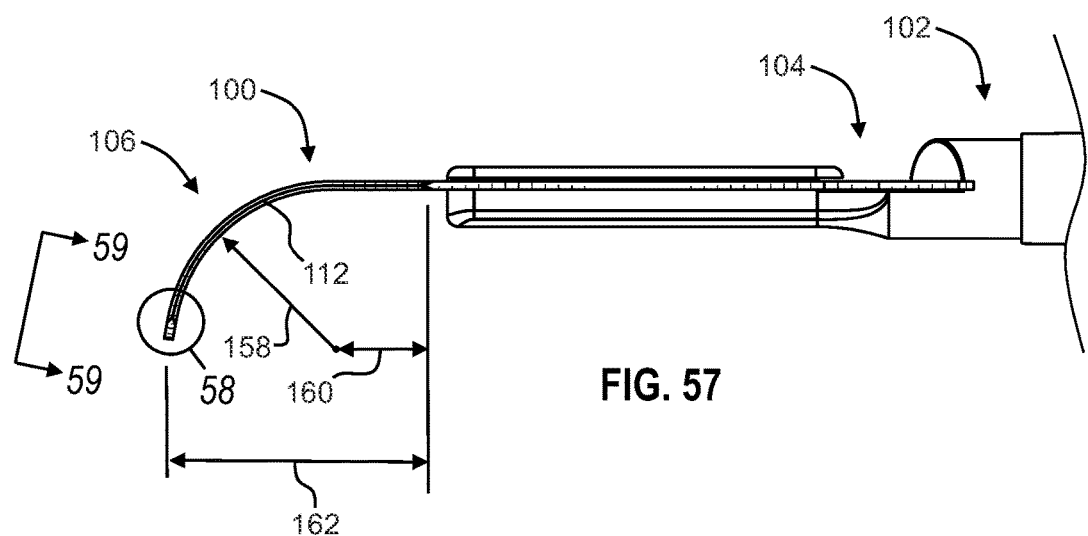
FIG. 57 is a diagrammatic partial side view of an example dental composite blade assembly, wherein the blade is of the type shown in FIG. 49.
Figure 58:
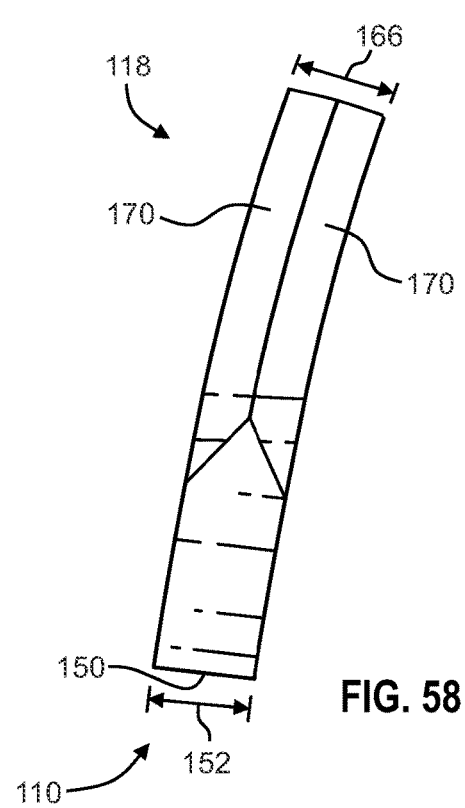
FIG. 58 is a diagrammatic magnified view of detail 58 in FIG. 57, illustrating aspects of the distal end of an example of a dental composite blade in accordance with the present disclosure.

Referring to FIG. 44, the tool path (e.g., arc 112) may preferably have a radius of curvature 158 of, for example, 8.29 mm (0.326 inches), or 7.5 mm to 9 mm. In the alternative, referring to FIG. 57, the arc 112 may preferably have a radius of curvature 158 of, for example, 7.14 mm (0.281 inches), or 7 mm to 8 mm. Moreover, the distance 160 from the proximal end 108 to the origin of the radius of curvature 158 may preferably be, for example, 3.34 mm (0.131 inches), or 3 to 4 mm. In the alternative, referring to FIG. 57, the distance 160 from the proximal end 108 to the origin of the radius of curvature 158 may preferably be, for example, 4.80 mm (0.189 inches), or 4 to 5.5 mm. Referring to FIG. 44, the tool portion 106 may preferably have a longitudinal length 162 of 10 mm (0.39 inches), or 9.5 mm to 11 mm. In the alternative, referring to FIG. 57, the tool portion 106 may preferably have a longitudinal length 162 of 12.4 mm (0.49 inches), or 12 mm to 14 mm. Referring to FIG. 47, one or both of the tool portion 106 and the mounting portion 104 of the blade 100 may preferably have a thickness 166 of 0.406 mm (0.016 inches), or 0.35 to 0.45 mm. In the alternative, referring to FIG. 58, in particular preferred embodiments, one or both of the tool portion 106 and the mounting portion 104 of the blade 100 may preferably have a thickness 166 of 0.381 mm (0.015 inches), or 0.3 to 0.4 mm.

Referring to FIGS. 6 and 55, the tool portion 106 may include a first lateral edge 122a and a second lateral edge 122b disposed on opposing sides of the transverse plane 114. The lateral edges 122a and 122b may each be convex at the proximal section 116 with respect to the transverse plane 114. The lateral edges 122a and 122b may be concave at the intermediate section 120 with respect to the transverse plane 114.

Referring to FIGS. 4 and 53, The tool portion 106 may include an obverse face 124 and a reverse face 126 disposed oppositely of one another, each of which extends between the first lateral edge 122a and second lateral edge 122b. The obverse and reverse faces may extend linearly in a transverse direction between the lateral edges 122a and 122b, the transverse direction being normal to the transverse plane 114. As shown in the various drawings herein, such configuration may result in a curved planar shape, in which the obverse and reverse faces are substantially flat along one axis and curved along another.

Referring to FIGS. 51, 53 and 55, in certain embodiments of the dental composite blade 100, the blade 100 may comprise a frontal plane 128 orthogonal to the transverse plane 114, and the proximal end 108 may be disposed within the frontal plane 128. Referring to FIG. 4, in certain such embodiments, most or all of the proximal section 116 and most or all of the distal section 118 may reside on opposing sides of the frontal plane 128. However, in other embodiments of the dental composite blade 100, such as the one shown at FIG. 53 for example, the entire tool portion 106 may reside within and/or on one side on one side of the frontal plane 128.

Figure 48:
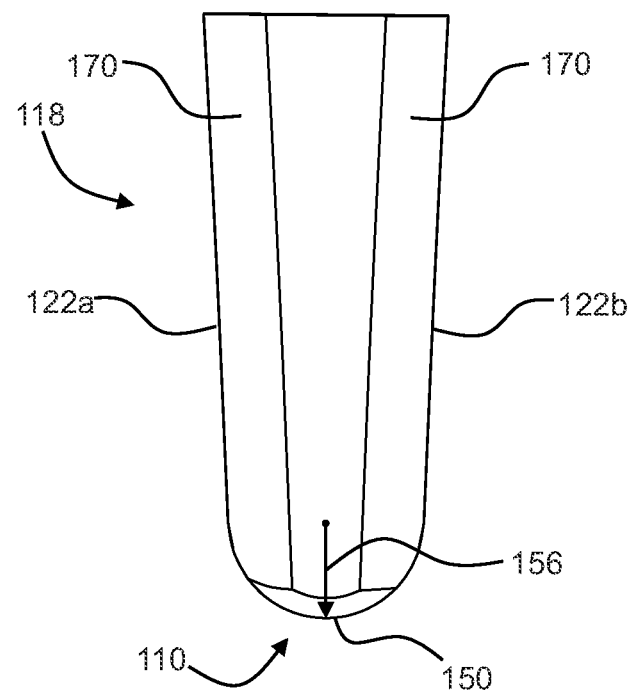
FIG. 48 is a diagrammatic magnified view of detail 48 in FIG. 44, illustrating further aspects of the distal end of an example of a dental composite blade in accordance with the present disclosure.
Figure 49:
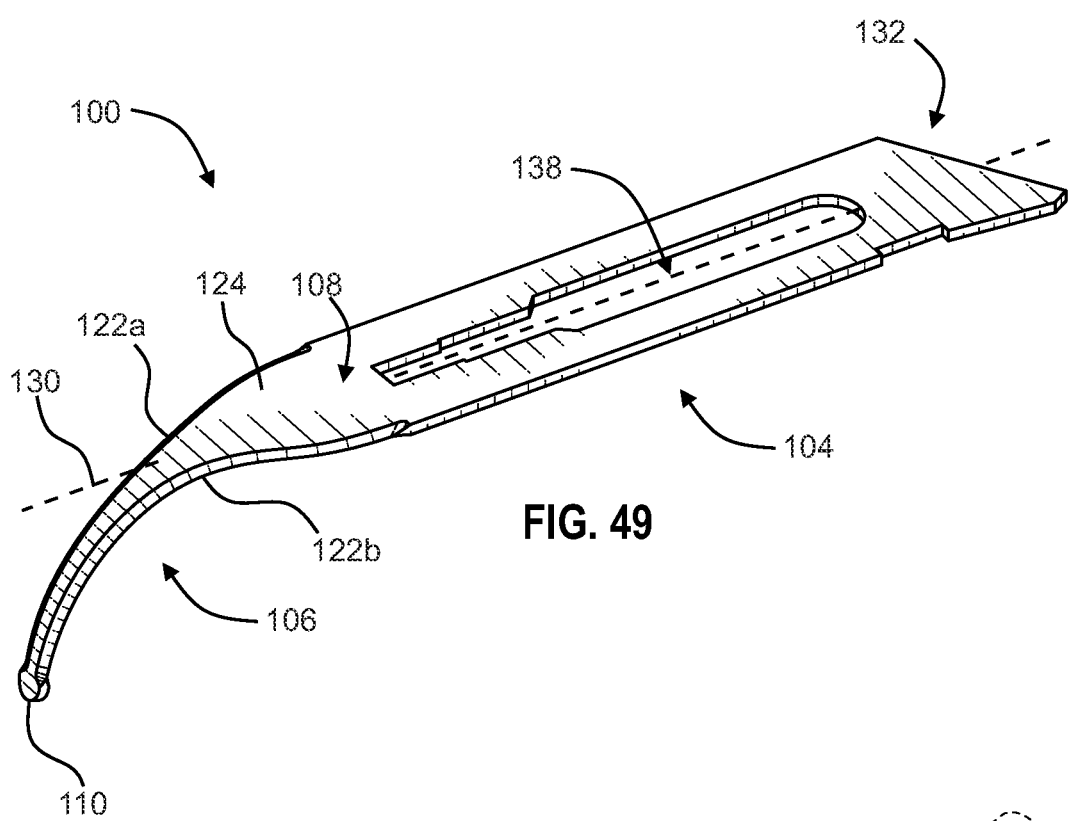
FIG. 49 is a perspective view of a fourth alternate example of a dental composite blade in accordance with the present disclosure.
Figure 59:
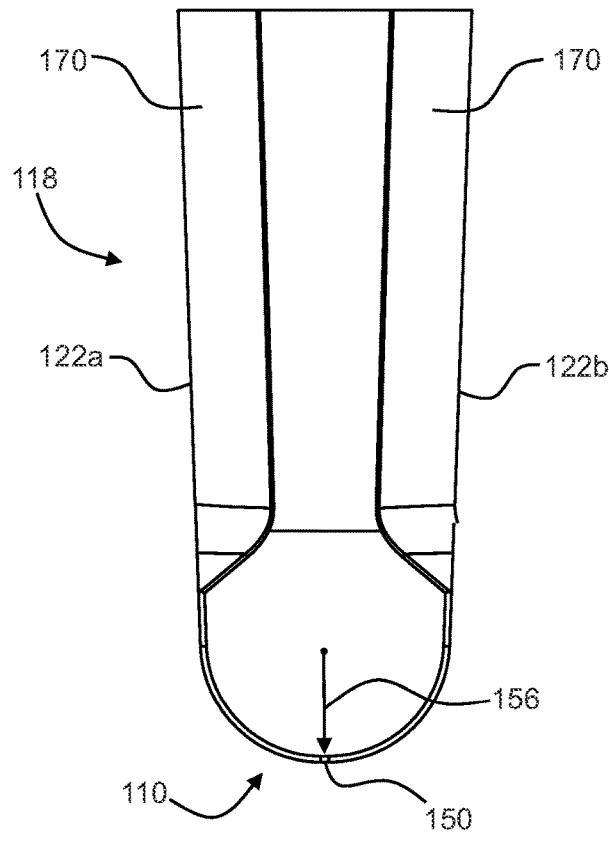
FIG. 59 is a diagrammatic magnified view of detail 59 in FIG. 57, illustrating further aspects of the distal end of an example of a dental composite blade in accordance with the present disclosure.

In particular embodiments of the dental composite blade 100, the lateral edges 122a and 122b may be closer together at the distal section 118 than at the proximal section 116. Additionally, or in the alternative, the lateral edges 122a and 122b may each extend linearly along the distal section 118, or may each be concave along the distal section 118 with respect to the transverse plane 114. Referring to FIGS. 48 and 59, the lateral edges 122a and 122b may be mutually tapered with respect to one another along the distal section 118.

Referring to FIGS. 44, 47, 48, 49, 58 and 59, in particular embodiments of the dental composite blade 100, one or both of the lateral edges 122a and 122b may be sharpened. In preferred embodiments, both lateral edges 122a and 122b are double-bevel sharpened. Each edge bevel 170 may preferably be 30 angular degrees, or 25-35 angular degrees. In the former case, the included angle would be 60 degrees, and in the latter case, the included angle would be 50-70 degrees.

Referring again to FIGS. 48 and 59, in certain embodiments of the dental composite blade 100 the distal end 110 may be rounded from the first lateral edge 122a to the second lateral edge 122b. a blade tip 150 defined at the distal end 110 may have a tip thickness 152 of 0.15 mm (0.006 inches), or 0.1 mm to 0.2 mm. Referring to FIG. 47, in certain embodiments of the dental composite blade 100, the blade tip 150 may preferably have a tip chamfer 154 of, for example, 45 angular degrees, or 40 to 50 angular degrees. The blade tip 150 may preferably have a tip radius 156 of, for example, 0.5 mm (0.02 inches), or 0.45 mm to 0.55 mm.

Figure 32:
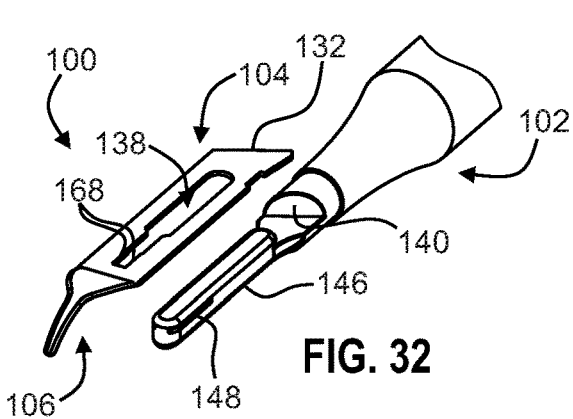
FIG. 32 is a diagrammatic partial perspective view of an example dental composite blade assembly wherein the example dental composite blade is shown dismounted from its respective blade holder.
Figure 33:
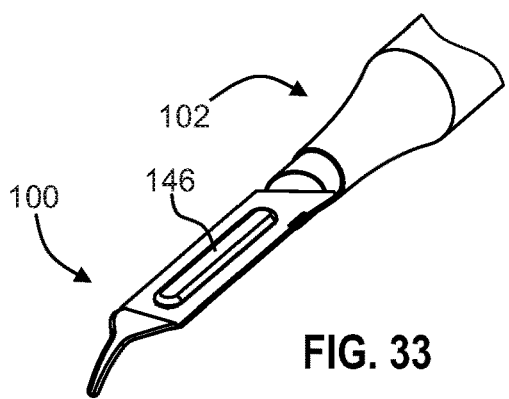
FIG. 33 is a diagrammatic partial perspective view of an example dental composite blade assembly similar to that of FIG. 32, but wherein the example dental composite blade is shown mounted to its respective blade holder.
Figure 34:
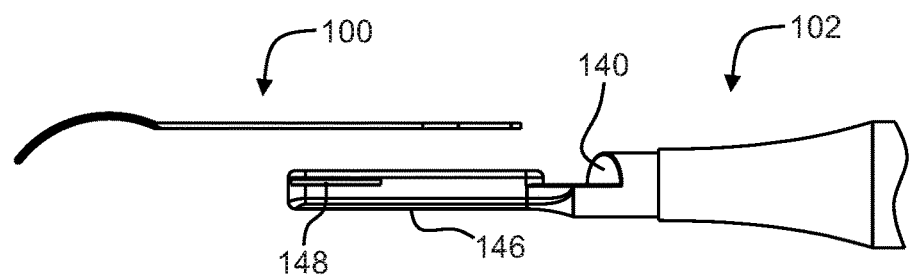
FIG. 34 is a diagrammatic partial side view of the example dental composite blade assembly shown in FIG. 32, illustrating the dental composite blade dismounted from the respective blade holder.
Figure 35:
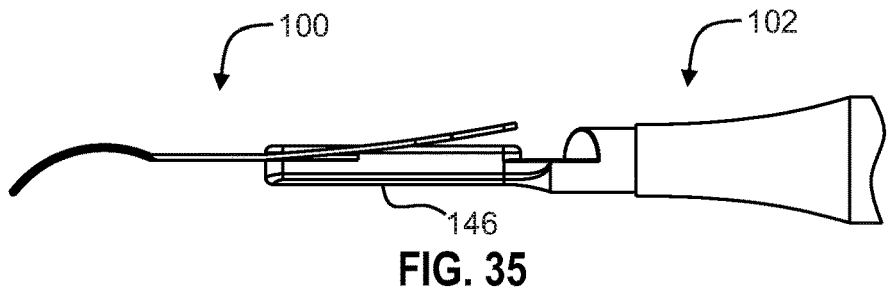
FIG. 35 is a diagrammatic partial side view of the example dental composite blade assembly similar to that of FIG. 34, but wherein the dental composite blade is shown beginning to be mounted to the blade holder, the inboard lips of the mounting slot being slidably received by a respective lateral groove of the blade retention element, and the mounting portion of the blade being resiliently bent to pass over part of the blade retention element.
Figure 36:
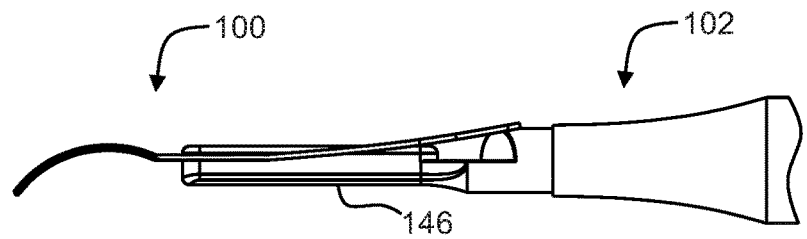
FIG. 36 is a diagrammatic partial side view of the example dental composite blade assembly similar to that of FIG. 35, but wherein the dental composite blade is shown more progressed toward being fully-mounted to the blade holder.
Figure 37:
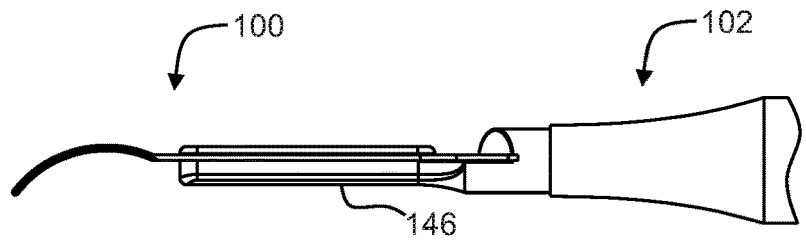
FIG. 37 is a diagrammatic partial side view of the example dental composite blade assembly similar to that of FIG. 36, but wherein the dental composite blade is shown fully-mounted to the blade holder, the mounting portion of the blade having returned to its original unbent configuration so as to axially secure the blade to the blade retention element.

Referring to FIGS. 6 and 55, the dental composite blade 100 may comprise a frontal plane 128 orthogonal to the transverse plane 114, and a longitudinal axis 130 defined at the intersection between the transverse plane 114 and the frontal plane 128. In such embodiments, the mounting portion 104 may include a terminal section 132, a tool interface section 134 and a securement section 136 extending therebetween along the longitudinal axis 130. The securement section 136 may include an elongated mounting slot 138 for receiving a blade retention element 146 of the blade holder 102. Referring to FIGS. 32 and 34, the blade retention element 146 may include one or more lateral grooves 148 configured to slidingly receive respective inboard lips 168 of the mounting slot 138 to prevent movement of the blade 100 in a direction normal to the frontal plane 128 when the blade 100 is secured to the blade holder 102 (e.g., as shown in FIGS. 8, 16, 24, 33, 37 and 50). Referring to FIG. 32, the terminal section 132 may be configured (e.g., angularly with respect to the longitudinal axis 130) to conformingly engage the mounting detent 140 of the blade holder 102.

Figure 38:
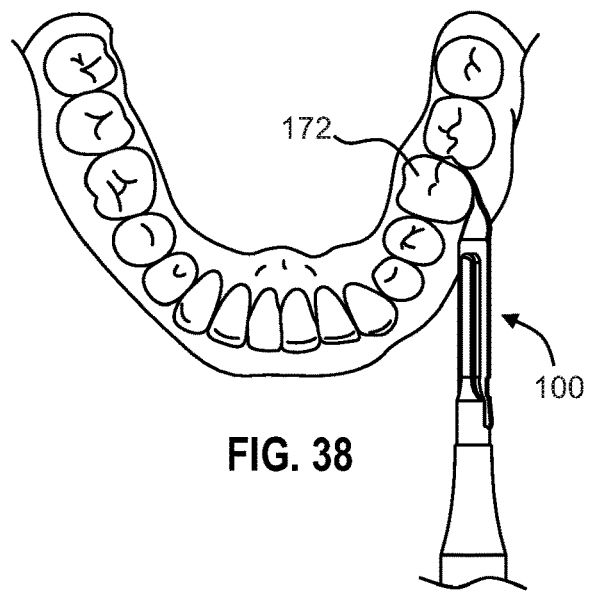
FIG. 38 is a diagrammatic plan view of a row of teeth with an example dental composite blade in accordance with the present disclosure, the tool portion of the blade having been partially rotated so as to reach and conform to the underside of the respective tooth.
Figure 39:
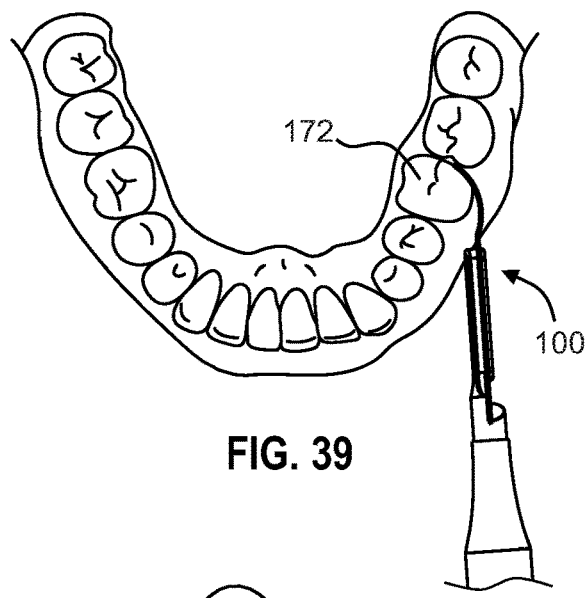
FIG. 39 is a diagrammatic plan view similar to that of FIG. 38, but wherein the tool portion of the blade has been partially rotated and flexed so as to continue to conform to the side of the tooth as the blade is moved away from the gumline.
Figure 40:
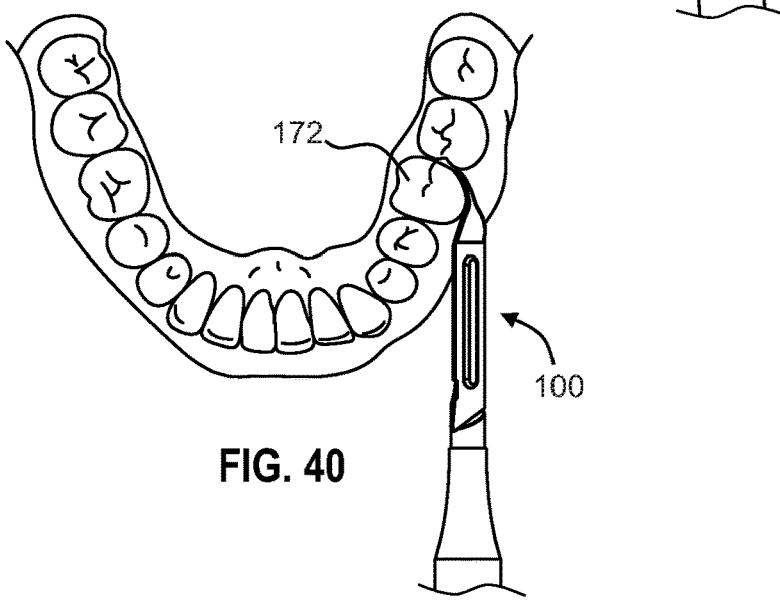
FIG. 40 is a diagrammatic plan view similar to that of FIG. 39, but wherein the tool portion of the blade has been partially rotated so as to continue to conform the blade edge to the upper side of the tooth as the blade is moved further away from the gumline.

Referring to FIG. 43, in certain preferred embodiments of the blade 100, some or all of the tool portion 106 may be resiliently flexible in a direction 164 normal to the frontal plane 128. Such flexibility may be particularly pronounced at the distal section 118 of the tool portion 106. Referring to FIGS. 38-40, this flexibility may be particularly useful in allowing the blade 100 to remain conformed to the unique curvature of each tooth 172 as the blade 100 is being manually manipulated by a dental professional along the tooth surface during a dental procedure. Notably, certain embodiments of the blade 100 in accordance with the present disclosure may find applicability in the general surgical context, as distinguished, for example, from a purely dental context.

Referring to FIGS. 12 and 44-46, a mounting portion 104 may include one or more securement flaps 142 attached to (e.g., extending from or formed integrally with) the securement section 136 for auxiliary engagement of the blade holder 102. The securement flaps 142 may be configured to resiliently press against the blade retention element 146 so as to more rigidly retain the blade 100 in engagement with the blade holder 102. The one or more securement flaps 142 may be disposed laterally of the longitudinal axis 130. The one or more securement flaps 142 may include an engagement relief 144, such as a filleted or chamfered corner. The engagement reliefs 144 may facilitate insertion and removal of a blade retention element 146 into and out of the retention channel 174 defined between the securement section 136 and the securement flaps 142. Notably, other embodiments of the blade 100, such as the one shown at FIG. 49, may also be adapted to include the aforementioned securement flaps 142.

In particular embodiments of a dental composite blade, a 43° non-cutting tip and 30° elliptical tapered curve and double cutting ends may extend down until the shank gives more access to interproximal and occlusal surfaces without having to switch blades, hands, or sides of mouth so as to avoid causing trauma to the surrounding tissue. The dental composite blade may be made from a stainless and/or carbon steel that does not stain tooth colored resins While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A dental composite blade comprising:
   a mounting portion for mounting the blade to a blade holder, and
   a tool portion including a proximal end and a distal end, and extending therebetween along an arc defined within a transverse plane, the tool portion further including
   (a) a proximal section adjacent the proximal end, a distal section adjacent the distal end, and an intermediate section between the proximal and distal sections;
   (b) a first lateral edge and a second lateral edge disposed on opposing sides of the transverse plane, the lateral edges each being convex at the proximal section with respect to the transverse plane, and concave at the intermediate section with respect to the transverse plane; and
   (c) an obverse face and a reverse face disposed oppositely of one another, each of which extends between the first and second lateral edges.

2. A dental composite blade as defined in claim 1 wherein the obverse and reverse faces extend linearly in a transverse direction between the lateral edges, the transverse direction being normal to the transverse plane.

3. A dental composite blade as defined in claim 1 wherein the lateral edges are closer together at the distal section than at the proximal section.

4. A dental composite blade as defined in claim 1 wherein the lateral edges each extend linearly along the distal section.

5. A dental composite blade as defined in claim 1 wherein the lateral edges are each concave along the distal section with respect to the transverse plane.

6. A dental composite blade as defined in claim 1 wherein the lateral edges are mutually tapered with respect to one another along the distal section.

7. A dental composite blade as defined in claim 1 wherein the lateral edges each have a double bevel with individual edge bevel angles of 25 to 35 degrees and an included angle of 50 to 70 degrees.

8. A dental composite blade as defined in claim 1 wherein the distal end is rounded from the first lateral edge to the second lateral edge.

9. A dental composite blade as defined in claim 1 wherein
   (a) the dental composite blade comprises a frontal plane orthogonal to the transverse plane, and a longitudinal axis defined at the intersection between the transverse plane and the frontal plane; and
   (b) and the mounting portion includes a terminal section, a tool interface section and a securement section extending therebetween along the longitudinal axis.

10. A dental composite blade as defined in claim 9 wherein the securement section includes an elongated mounting slot for receiving a blade retention element of the blade holder.

11. A dental composite blade as defined in claim 9 wherein the mounting portion includes one or more securement flaps attached to the securement section for auxiliary engagement of the blade holder, the one or more securement flaps being disposed laterally of the longitudinal axis.

12. A dental composite blade as defined in claim 11 wherein the one or more securement flaps include an engagement relief.

13. A dental composite blade as defined in claim 1 wherein
   (a) the dental composite blade comprises a frontal plane orthogonal to the transverse plane;
   (b) the proximal end is disposed within the frontal plane; and
   (c) most or all of the proximal section and most or all of the distal section reside on opposing sides of the frontal plane.

14. A dental composite blade as defined in claim 1 wherein the blade is removably mounted to the blade holder.

15. A dental composite blade comprising:
   a mounting portion for mounting the blade to a blade holder;
   a tool portion including
   (a) a proximal end and a distal end, and extending therebetween along a tool path defined within a transverse plane; and
   (b) a first lateral edge and a second lateral edge disposed on opposing sides of the transverse plane;
   a frontal plane defined orthogonally to the transverse plane; and
   a longitudinal axis defined at the intersection between the transverse plane and the frontal plane;
   wherein the mounting portion includes
   (a) a terminal section, a tool interface section and a securement section extending therebetween along the longitudinal axis, the securement section including an elongated mounting slot for receiving a blade retention element of the blade holder; and
   (b) one or more securement flaps attached to the securement section for auxiliary engagement of the blade holder, the one or more securement flaps being disposed laterally of the longitudinal axis.

16. A dental composite blade as defined in claim 15 wherein the one or more securement flaps include an engagement relief.

17. A dental composite blade as defined in claim 15 wherein the tool path is an arc.

18. A dental composite blade as defined in claim 15 wherein the tool portion further includes
   (a) a proximal section adjacent the proximal end, a distal section adjacent the distal end, and an intermediate section between the proximal and distal sections; and (b) an obverse face and a reverse face disposed oppositely of one another, each of which extends between the first and second lateral edges;

wherein the lateral edges are each convex at the proximal section with respect to the transverse plane, and concave at the intermediate section with respect to the transverse plane.

19. A dental composite blade as defined in claim 15 wherein the distal end is rounded from the first lateral edge to the second lateral edge.

20. A dental composite blade comprising:

a mounting portion for mounting the blade to a blade holder, and a tool portion including a proximal end and a distal end, and extending therebetween along an arc defined within a transverse plane, the tool portion further including (a) a proximal section adjacent the proximal end, a distal section adjacent the distal end, and an intermediate section between the proximal and distal sections;

(b) a first lateral edge and a second lateral edge disposed on opposing sides of the transverse plane, the lateral edges each being convex at the proximal section with respect to the transverse plane, and concave at the intermediate section with respect to the transverse plane; and (c) an obverse face and a reverse face disposed oppositely of one another, each of which extends between the first and second lateral edges;

wherein (a) a frontal plane is defined orthogonally to the transverse plane;

(b) a longitudinal axis is defined at the intersection between the transverse plane and the frontal plane;

(c) the mounting portion includes a terminal section, a tool interface section and a securement section extending therebetween along the longitudinal axis; and (d) the securement section includes an elongated mounting slot for receiving a blade retention element of the blade holder.

* * * * *